US010216387B2

(12) United States Patent
Kim et al.

(10) Patent No.: US 10,216,387 B2
(45) Date of Patent: Feb. 26, 2019

(54) APPARATUS AND METHOD FOR GENERATING AND DISPLAYING CARTOON CONTENT

(71) Applicant: NAVER CORPORATION, Seongnam-si (KR)

(72) Inventors: Hyo Kim, Seongnam-si (KR); Hyun Chul Lee, Seongnam-si (KR); Ji Han Kim, Seongnam-si (KR); Dai Hyun Lim, Seongnam-si (KR); Byoung Kwan Kim, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 0 days.

(21) Appl. No.: 14/994,730

(22) Filed: Jan. 13, 2016

(65) Prior Publication Data

US 2016/0210772 A1 Jul. 21, 2016

(30) Foreign Application Priority Data

Jan. 16, 2015 (KR) ........................ 10-2015-0008257

(51) Int. Cl.
*G06F 17/00* (2006.01)
*G06F 3/0484* (2013.01)
(Continued)

(52) U.S. Cl.
CPC ........ *G06F 3/04845* (2013.01); *G06F 3/0488* (2013.01); *G06T 11/40* (2013.01); *G06T 13/80* (2013.01); *G06T 2200/24* (2013.01)

(58) Field of Classification Search
None
See application file for complete search history.

(56) References Cited

U.S. PATENT DOCUMENTS 6,269,173 B1 * 7/2001 Hsien ................ G06Q 30/0276
  382/103
7,724,208 B1 * 5/2010 Engel ................ G02B 27/2278
  345/4

(Continued)

FOREIGN PATENT DOCUMENTS

JP 2000-194871 A 7/2000
JP 2001009080 A * 1/2001
(Continued)

OTHER PUBLICATIONS

Chang, "User-generated cartoon message service method in a mobile environment", 2009, 1020090084123 (Google Translation).*

(Continued)

*Primary Examiner* — David H Chu
(74) *Attorney, Agent, or Firm* — Greer Burns & Crain Ltd.

(57) ABSTRACT

An apparatus for generating cartoon content includes: a cut input controller configured to control inputting a signal of adding a cut including a plurality of layers; an effect input controller configured to control inputting a type of an effect applied to the plurality of layers; and a cut generator configured to generate a final cut such that the plurality of layers express the effect in correspondence with a user event received from a user, wherein the effect input controller controls receiving of an initial location and a final location of at least two of the plurality of layers in correspondence with the effect, and the cut generator determines a moving speed of each of the plurality of layers in consideration of a distance difference between the initial location and the final location of each of the plurality of layers, and generates the final cut such that the plurality of layers individually move at the moving speed of each of the plurality of layers.

7 Claims, 21 Drawing Sheets

(51) Int. Cl.
*G06F 3/0488* (2013.01)
*G06T 11/40* (2006.01)
*G06T 13/80* (2011.01)

(56) References Cited

U.S. PATENT DOCUMENTS

| | | | | |
|---|---|---|---|---|
| 2007/0300187 | A1* | 12/2007 | Hama | G06F 3/0482 715/830 |
| 2010/0255906 | A1* | 10/2010 | Chen | A63F 13/10 463/31 |
| 2013/0104015 | A1* | 4/2013 | Nonaka | G06F 17/243 715/204 |
| 2013/0155180 | A1* | 6/2013 | Wantland | G06T 7/73 348/36 |
| 2014/0215383 | A1* | 7/2014 | Park-Ekecs | G06F 3/0485 715/784 |
| 2015/0082339 | A1* | 3/2015 | Sumitomo | H04N 21/812 725/32 |
| 2016/0062629 | A1* | 3/2016 | Takiguchi | G06F 3/016 715/763 |
| 2017/0132829 | A1* | 5/2017 | Blas, Jr. | G06T 13/80 |

FOREIGN PATENT DOCUMENTS

| | | |
|---|---|---|
| KR | 10-2005-0078100 A | 8/2005 |
| KR | 10-2009-0084123 A | 8/2009 |
| KR | 10-2011-0049257 A | 5/2011 |

OTHER PUBLICATIONS

Bone, "Parallax Scrolling: A simple effective way to add depth to a 2D game", Jun. 17, 2014, URL: https://gamedevelopment.tutsplus.com/tutorials/parallax-scrolling-a-simple-effective-way-to-add-depth-to-a-2d-game--cms-21510.*

SmartWebby, "Flash Animation Basics", URL: http://web.archive.org/web/20140209182929/http://www.smartwebby.com/Flash/flash_animations.asp, 2014.*

Casebradfo, "Animating a color change with Flash", URL: https://digicompdiy.wordpress.com/2011/11/29/animating-a-color-change-with-flash/, 2011.*

Parkeh, "A smiple parallax scrolling technique", URL: https://code.tutsplus.com/tutorials/a-simple-parallax-scrolling-technique--net-27641, 2012.* ihatetomatoes.net, "A Guide to JavaScript Scrolling Animations Libraries", Jul. 17, 2017, URL: https://web.archive.org/web/20140717023208/https://ihatetomatoes.net/demos/scrolling-libraries/.*

Ihatetomatoes, "News—ScrollMagic Demo, Website Deconstructions", Sep. 22, 2014, URL: https://www.youtube.com/watch?v=vnx4mEH6HK0.*

Gamache, "Parallax Demo", Dec. 25, 2014, URL: https://web.archive.org/web/20141225020301/http://davegamache.com/parallax/.*

Korean Office Action issued in corresponding Korean patent application No. 10-2015-0008257, dated Jun. 20, 2016.

Office Action issued in corresponding Taiwanese Patent Application No. 105100247, dated Apr. 20, 2017 (with translation).

* cited by examiner

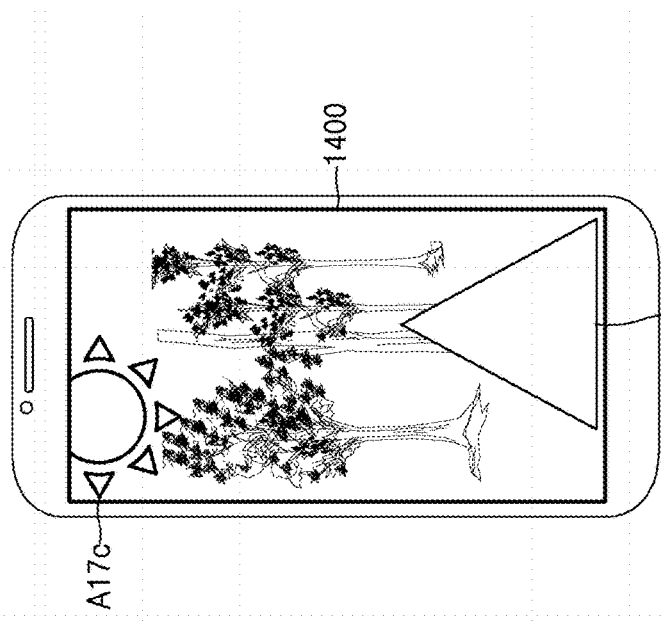
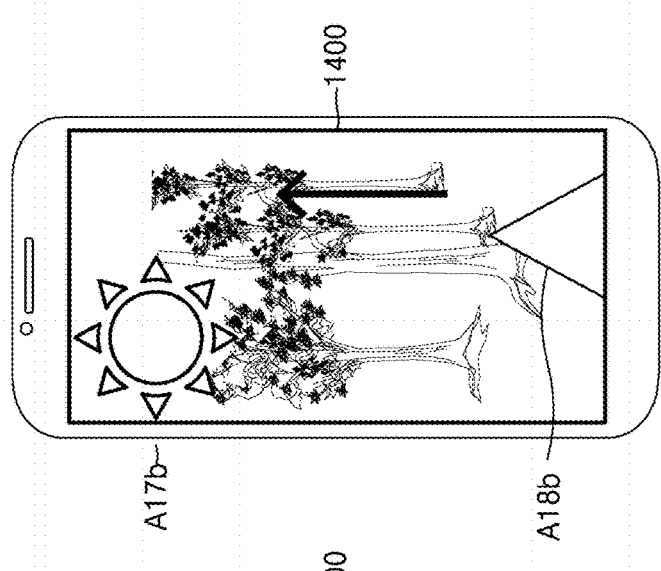
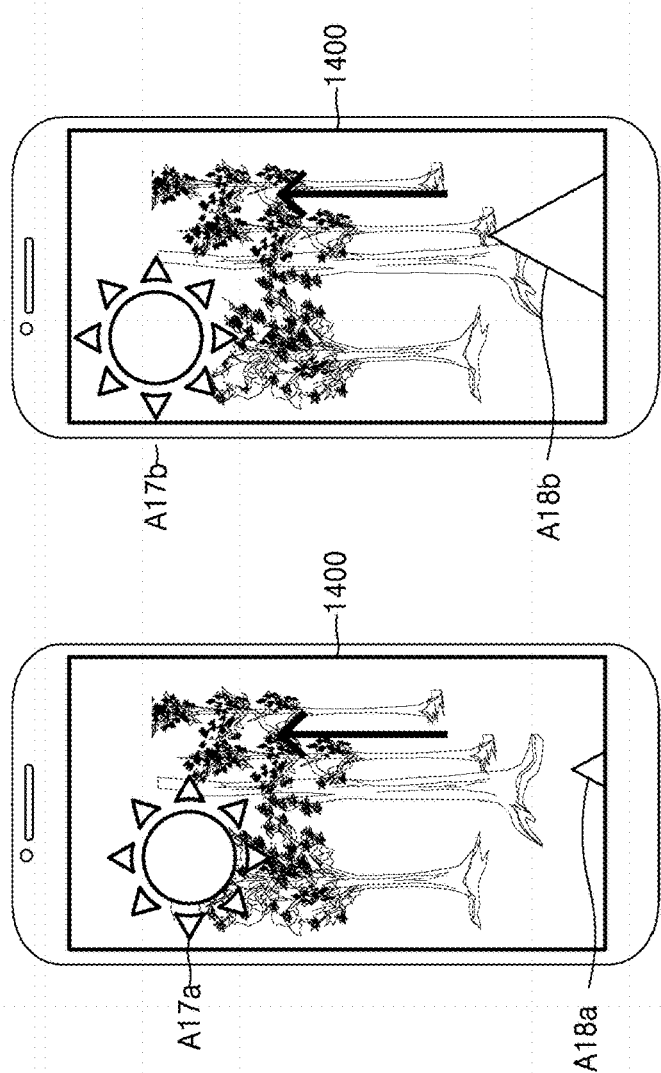

FIG. 16A
FIG. 16B
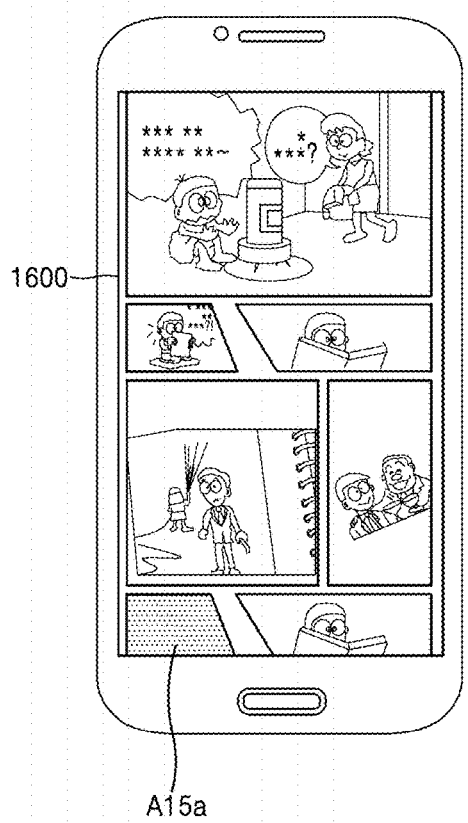
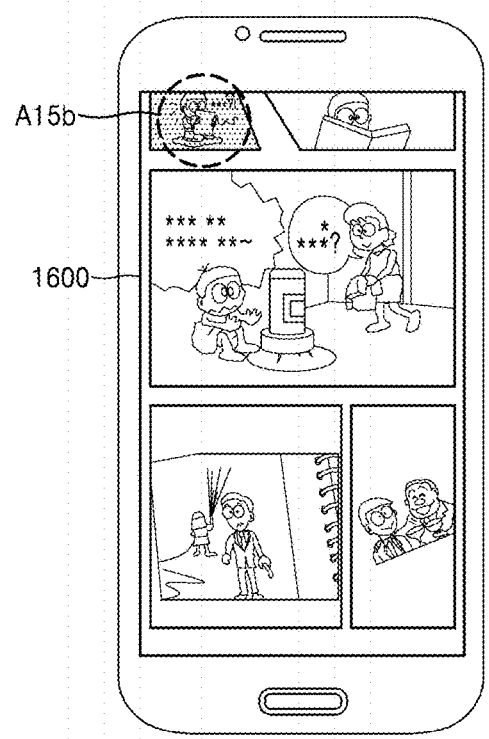

FIG. 18A
FIG. 18B
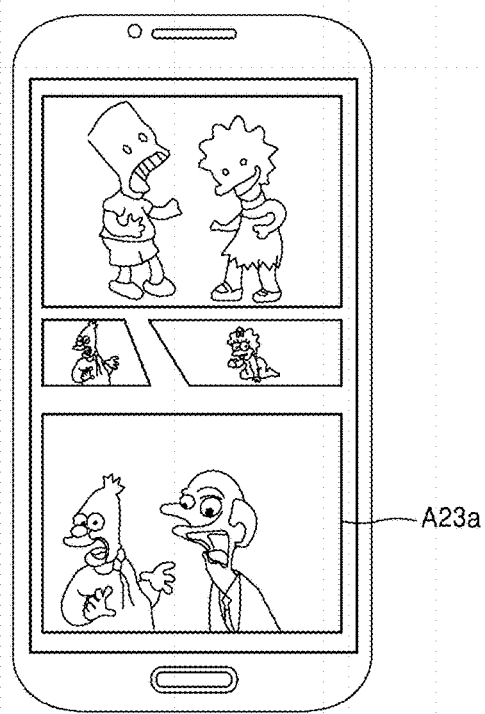
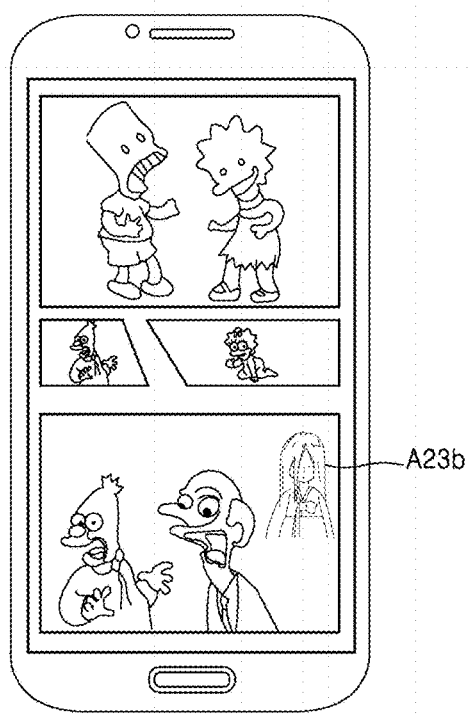

FIG. 20A
FIG. 20B

APPARATUS AND METHOD FOR GENERATING AND DISPLAYING CARTOON CONTENT

CROSS-REFERENCE TO RELATED APPLICATIONS

This application claims the benefit of Korean Patent Application No. 10-2015-0008257, filed on Jan. 16, 2015, in the Korean Intellectual Property Office, the disclosure of which is incorporated herein in its entirety by reference.

BACKGROUND

1. Field

One or more exemplary embodiments of the present invention relate to an apparatus, method, and computer program for generating cartoon content and a method of displaying the cartoon content, and more particularly, to an apparatus, method, and computer program for generating cartoon content including various effects such as movements, perspective effect, time difference, etc. and a method of displaying the cartoon content by making effects of the cartoon content correspond to input user events.

2. Description of the Related Art

A cartoon is a picture intended to satirize or criticize life or society by exaggerating or omitting the features of an object and using humor, caricature, social commentary, etc. Cartoons may be classified into various types, e.g., a romance cartoon, a martial arts cartoon, an action cartoon, a comic cartoon, a sports cartoon, a science fiction (SF) cartoon, etc., according to the contents thereof. A cartoon may show complex human attitudes using a visual system of pictures (images) and characters (text) and is thus more effective to attract the attention of readers than a general book containing only characters.

Recently, with advancements in communication technology, cartoons have been provided not only through comic books but also via the Internet or the like.

SUMMARY

One or more exemplary embodiments of the present invention provide an apparatus, method, and computer program for generating cartoon content as intended by a cartoon content creator.

One or more exemplary embodiments provide an apparatus, method, and computer program for generating cartoon content, thereby generating a cartoon content cut that expresses an effect selected by a cartoon content creator, based on the type of the effect and the property information of the effect.

One or more exemplary embodiments provide an apparatus for displaying cartoon content, thereby displaying various effects corresponding to user events.

Additional aspects will be set forth in part in the description which follows and, in part, will be apparent from the description, or may be learned by practice of the presented embodiments.

According to one or more exemplary embodiments, an apparatus for generating cartoon content includes: a cut input controller configured to control inputting a signal of adding a cut including a plurality of layers; an effect input controller configured to control inputting a type of an effect applied to the plurality of layers; and a cut generator configured to generate a final cut such that the plurality of layers express the effect in correspondence with a user event received from a user, wherein the effect input controller controls receiving of an initial location and a final location of at least two of the plurality of layers in correspondence with the effect, and the cut generator determines a moving speed of each of the plurality of layers in consideration of a distance difference between the initial location and the final location of each of the plurality of layers, and generates the final cut such that the plurality of layers individually move at the moving speed of each of the plurality of layers.

The effect input controller may control inputting of an initial color and a final color of each of the plurality of layers in correspondence with the effect, and the cut generator may generate the final cut such that each of the plurality of layers change from the initial color to the final color.

The initial location or the final location may be an arbitrary location inside or outside the cut.

The effect input controller may further input an intermediate location of each of the plurality of layers in correspondence with the effect, and the cut generator may calculate a first speed based on a distance difference between the initial location and the intermediate location of each of the plurality of layers, calculate a second speed based on a distance difference between the intermediate location and the final location of each of the plurality of layers, and generate the final cut such that each of the plurality of layers move in the first speed and then in the second speed from the intermediate location.

The effect input controller may input at least one of the plurality of layers as an additional layer displayed in correspondence with a user event in a reverse direction, in correspondence with the effect, and the cut generator may generate a first final cut comprising the additional layer displayed in correspondence with the user event in the reverse direction, and a second final cut including remaining layers excluding the additional layer, which are displayed in correspondence with a user event in a forward direction.

According to one or more exemplary embodiments, a method of generating cartoon content includes: inputting, by a cut input controller, a signal of adding a cut including a plurality of layers; inputting, by an effect input controller, a type of an effect applied to the plurality of layers as a time difference effect, and an initial location and a final location of each of the plurality of layers in correspondence with the time difference effect; and generating, by a cut generator, a final cut such that the plurality of layers express the time difference effect in correspondence with a user event received from a user, wherein the generating of the final cut includes determining a moving speed of each of the plurality of layers in consideration of a distance difference between the initial location and the final location of each of the plurality of layers, and generating the final cut such that the plurality of layers individually move at the moving speed of each of the plurality of layers.

According to one or more exemplary embodiments, an apparatus for displaying cartoon content includes: a display unit configured to display a display region of the cartoon content; an input unit configured to input a user event from a user; an event processor configured to calculate a moving distance corresponding to the user event; and a display controller configured to control displaying of the cartoon content as much as the moving distance while adjusting a display location of a layer included in a cut in consideration of a display rate of the cut included in the display region corresponding to the user event.

According to one or more exemplary embodiments, there are provided other methods and systems for accomplishing the inventive concept, and a non-transitory computer-readable recording medium having recorded thereon a computer program for performing the other methods.

BRIEF DESCRIPTION OF THE DRAWINGS

These and/or other aspects of the present invention will become apparent and more readily appreciated from the following description of the embodiments, taken in conjunction with the accompanying drawings in which:

FIGS. 14A through 14C show examples of a user interface that displays a cartoon cut including layers to which a time difference effect is applied;

FIGS. 16A and 16B show another example of a user interface that displays cartoon content;

FIGS. 18A and 18B show an example of an additional layer displayed in correspondence with a user event in a reverse direction;

FIGS. 20A and 20B show an example of an additional layer displayed in correspondence with a user event in a reverse direction.

DETAILED DESCRIPTION

Figure 1:
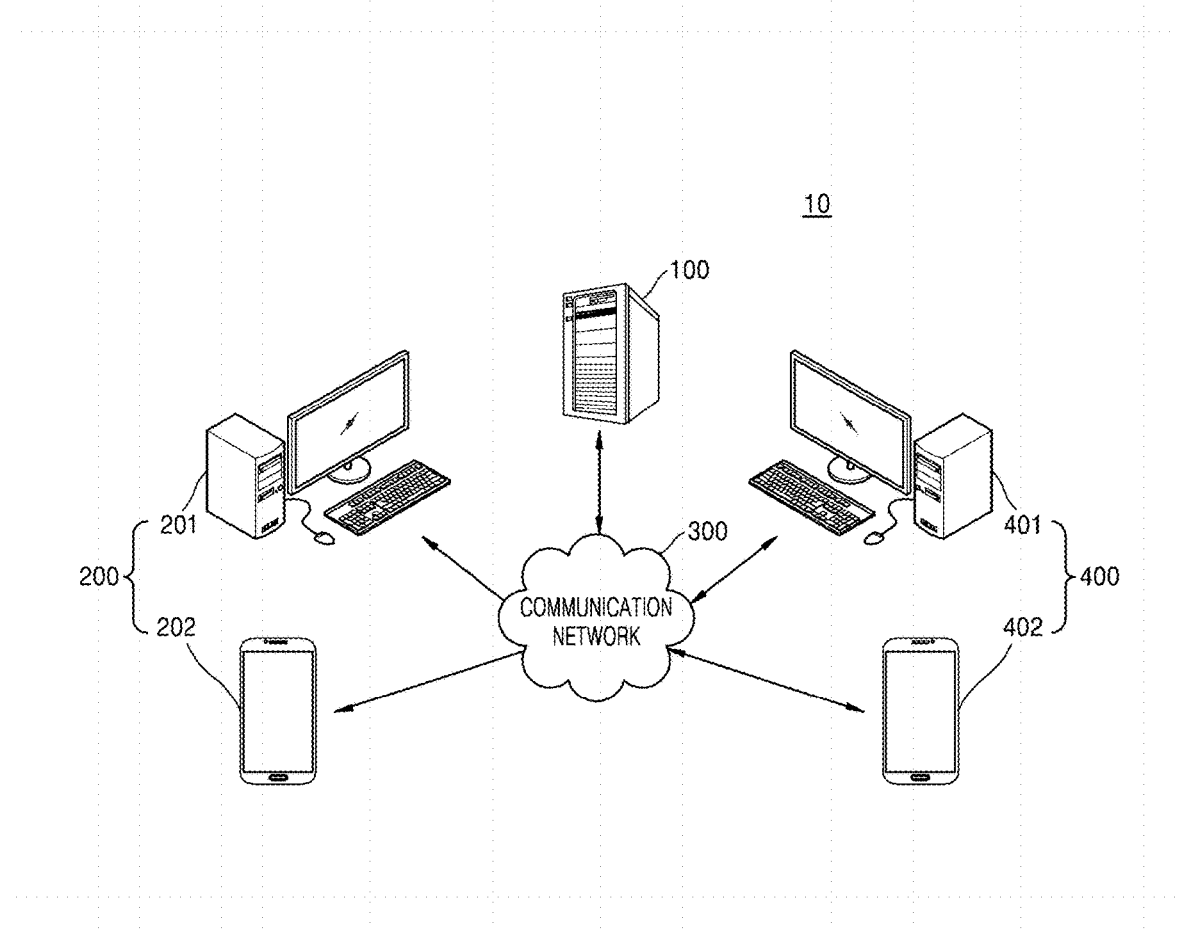
FIG. 1 is a diagram of a cartoon content providing system according to one exemplary embodiment.

Reference will now be made in detail to embodiments of the present invention, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list.

It will be understood that although the terms 'first', 'second,' etc. may be used herein to describe various components, these components should not be limited by these terms. These components are only used to distinguish one component from another.

As used herein, the singular forms 'a', 'an' and 'the' are intended to include the plural forms as well, unless the context clearly indicates otherwise.

It will be further understood that the terms 'comprise' and/or 'comprising' used herein specify the presence of stated features or components, but do not preclude the presence or addition of one or more other features or components.

When a certain embodiment may be implemented differently, a specific process order may be performed differently from the described order. For example, two consecutively described processes may be performed substantially at the same time or performed in an order opposite to the described order The term 'cartoon content' may mean data created by a cartoon content creator or a cartoonist. A piece of the cartoon content may be configured to include at least one cut. The term 'cut' may mean data containing one scene and may include at least one layer including an image or text. The cartoon content may individually include each cut as an image file or may include one image file including all of the at least one cut.

The term 'display region' is a region of the cartoon content that is shown to a user through a display unit or the cartoon content displayed in response to a user request on the region. The cartoon content may correspond to and move according to user events that are input by the user. The display region may be changed according to the movement of the cartoon content, and accordingly the displayed cartoon content may also be changed.

The term 'effect' indicates an animation operation that is contained in the whole of the cartoon content or a part thereof and is contained in a layer or a cut. In more detail, the effect includes a movement of a layer, division, going down, going up, expansion, a slow movement, a fast movement, an operation causing a color change, a perspective effect of a cut, a movement of a time difference, rotation, transparent processing, rescaling, and setting a clipping region, but is not limited thereto.

The cut or the layer may include property information. The property information of the cut or the layer may include location information, layer information, or other effect information.

In more detail, the location information is information relating to the layer or the cut that is not fixed but moves such as the movement or moves while individual time intervals and indicates a location that displays the layer or the cut in which the effect is set. The location information may designate an inner or outer location that displays the cut as a pixel value or a percent value. For example, in the case of a first cut including a first layer, initial and final locations of the first layer may be set as locations in the first cut.

The layer information is information regarding a display sequence of a plurality of layers included in the cut or the layer and may be set as sequentially increasing or decreasing numbers from a layer that is to be displayed uppermost to a layer that is to be displayed lowermost. A plurality of layers included in one cut or layer may be displayed according to the set layer information. A first layer and a second layer displayed behind the first layer may be wholly or partially overlapped. Other effect information may include movement information, speed information, music information, vibration information, color information, an effect display start time, etc. For example, the effect information may include information regarding an initial location, a final location, a start time, or an end time of the layer or the cut or a color change time or point. The effect information may include a first color that is initial color information and a second color that is color information changed from the first color in connection with a color changing effect. The effect information may include a movement speed such as 2 times, 3 times, ½ times, and ⅓ times of speed corresponding to a user event.

FIG. 1 is a diagram of a cartoon content providing system 10 according to an exemplary embodiment.

Referring to FIG. 1, the cartoon content providing system 10 according to the exemplary embodiments includes a cartoon content display apparatus 200, a cartoon content server 100, a communication network 300, and a cartoon content generation apparatus 400.

The cartoon content server 100 provides cartoon content or cartoon content display means to a user terminal. The cartoon content server 100 may provide the cartoon content classified according to authors, episodes, works, and days and may provide works of which publishing has been finished. The cartoon content server 100 may selectively provide the cartoon content according to a request from the cartoon content display apparatus 200. The cartoon content server 100 may receive and store cartoon content generated by the cartoon content generation apparatus 400.

The cartoon content generation apparatus 400 provides means for generating the cartoon content to a cartoon content creator (for example, a cartoonist). The cartoon content generation apparatus 400 may provide a user interface for conveniently generating 2D cartoon content. The cartoon content generation apparatus 400 may provide a function of generating one or more cuts included in the cartoon content, a function of generating one or more layers included in the cuts, or an effect input function of applying an effect to the layers. The cartoon content generation apparatus 400 may provide a function of changing and generating a layer including the effect such that the effect may be appropriately provided to a user with respect to the layer. Here, the user is the person who creates the cartoon data.

For example, if the cartoonist sets a time difference effect which causes a plurality of layers included in the cut to move at different times or at different speeds, the cartoon content generation apparatus 400 may control initial and final location information to be input into a plurality of layers included in the cut and may generate cartoon content such that the layers may move along movement paths between respective initial and final locations. In this regard, the respective layers may move at different movement speeds along the movement paths of the respective layers.

If the cartoonist sets a perspective effect to a cut, the cartoon content generation apparatus 400 may control layer information to be input into a plurality of layers included in the cut and may generate cartoon content such that the layers may have movements according to the layer information.

In addition, if the cartoonist sets an effect to a cut to move at a 3 times the speed corresponding to a user event, the cartoon content generation apparatus 400 may generate cartoon content including the effect to move the cut at a speed 3 times the preset general speed.

In alternative exemplary embodiments, the cartoon content generation apparatus 400 may control start or end time information to be input into the whole or a part of one or more layers included in a cut. The cartoon content generation apparatus 400 may generate a final cut to express cuts in correspondence with a start or end time. That is, the cartoon content generation apparatus 400 may generate the final cut such that cuts may be expressed from the start time to the end time, and, if the end time elapses, a final layer may be displayed.

The plurality of cartoon content generation apparatuses 400 may mean communication terminals using a web service in a wired/wireless communication environment. In this regard, the cartoon content generation apparatus 400 may be a personal computer 401 of the user or a mobile terminal 402 of the user. The mobile terminal 402 is illustrated as a smart phone in FIG. 1 but the exemplary embodiments are not limited thereto. As described above, a terminal having an application capable of web browsing embedded therein may be employed without limitation.

In more detail, the cartoon content generation apparatus 400 may include a computer (e.g., a desktop computer, a laptop computer, a tablet PC, etc.), a media computing platform (e.g., a cable, a satellite set-top box, a digital video recorder, etc.), a handheld computing device (e.g., a PDA, an email client, etc.), any type of a mobile phone, or other types of computing or communication platforms, but the exemplary embodiments are not limited thereto.

The cartoon content display apparatus 200 may be an apparatus that displays the cartoon content received from the cartoon content server 100 or stored cartoon content in correspondence with a user event. In this regard, the cartoon content may be data generated by the cartoon content generation apparatus 400. The cartoon content display apparatus 200 may display the cartoon content from a first cut to a last cut on one page or on a plurality of pages. The cartoon content display apparatus 200 may move the cartoon content in correspondence with the user event, change a display region displayed on a display unit of the cartoon content display apparatus 200, and display the cartoon content.

The cartoon content display apparatus 200 may move the cartoon content including a perspective effect and a time difference effect which causes a plurality of layers included in the cut to move at different times or at different speeds, in correspondence with the user event and display the effect. In this regard, the effect may be displayed from a start time set by a creator.

The cartoon content display apparatus 200 may adjust a moving speed of the cartoon content according to information (types and number of effects, types and number of layers, number of words included in text, etc.) regarding the user event and a cut included in a currently displayed first region, an average reading speed of the cartoon content, or an average reading speed of the user, etc. In alternative exemplary embodiments, the cartoon content display apparatus 200 may adjust a moving distance of the cartoon content according to the information regarding the user event and the cut included in the currently displayed first region.

The cartoon content display apparatus 200 may determine the moving speed and distance of the cartoon content such that the cartoon content may correspond to not only the user event but also content of the cartoon content.

The cartoon content display apparatus 200 may display the cartoon content in consideration of an effect applied to one or more layers included in a cut included in the cartoon content when providing the cartoon content received from the cartoon content server 100 or stored cartoon content. The cartoon content display apparatus 200 may display respective layers according to types of the respective layers. A method of displaying the cartoon content according to the types of layers and an applied effect will be described in detail with reference to FIGS. 2 through 18.

The plurality of cartoon content display apparatuses 200 mean communication terminals using a web service in a wired/wireless communication environment. In this regard, the cartoon content display apparatus 200 may be a personal computer 201 of the user or a mobile terminal 202 of the user. The mobile terminal 202 is illustrated as a smart phone in FIG. 1 but the exemplary embodiments are not limited thereto. As described above, a terminal having an application capable of web browsing embedded therein may be employed without limitation.

In more detail, the cartoon content display apparatus 200 may include a computer (e.g., a desktop computer, a laptop computer, a tablet PC, etc.), a media computing platform (e.g., a cable, a satellite set-top box, a digital video recorder, etc.), a handheld computing device (e.g., a PDA, an email client, etc.), any type of a mobile phone, or other types of computing or communication platforms, but the exemplary embodiments are not limited thereto.

The communication network 300 may connect the plurality of cartoon content display apparatuses 200 and the cartoon content server 100. That is, the communication network 300 may provide connection paths for transmitting and receiving data between the cartoon content display apparatuses 200 and the cartoon content server 100 after the cartoon content display apparatuses 200 access the cartoon content server 100. The communication network 300 may include, for example, wired networks such as local-area networks (LANs), wide-area networks (WANs), metropolitan area networks (MANs), integrated service digital networks (ISDNs), etc. or wireless networks such as wireless LANs, CDMA, Bluetooth, satellite network, etc., but the exemplary embodiments are not limited thereto.

The cartoon content generation apparatus 400 according to the present exemplary embodiments may set an effect with respect to a cut or one or more layers included in the cut, convert the cut or the respective layers to be expressed to include the effect, and generate a final cut including the converted cut or layers. Accordingly, the cartoon content display apparatus 200 according to the exemplary embodiments may move and display cartoon content including the effect in correspondence with a user event.

Figure 2:
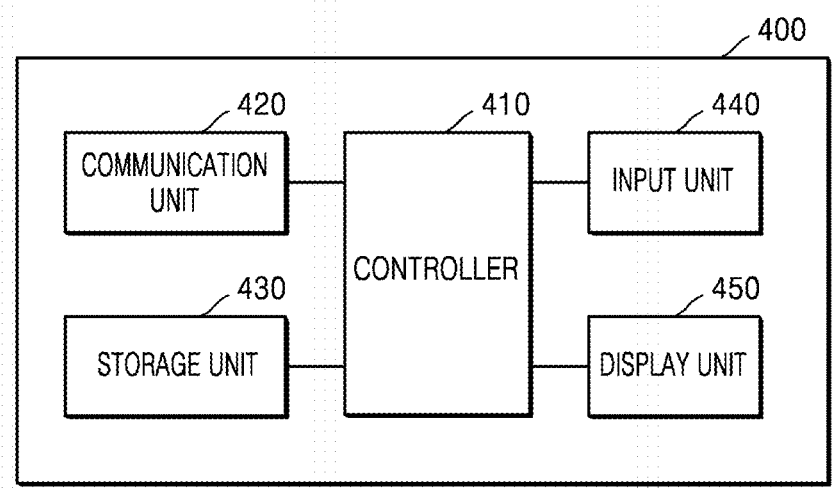
FIG. 2 is a block diagram of a cartoon content generation apparatus according to an exemplary embodiment.

FIG. 2 is a block diagram of the cartoon content generation apparatus 400 according to one exemplary embodiment.

Referring to FIG. 2, the cartoon content generation apparatus 400 according to the exemplary embodiment includes a controller 410, a communication unit 420, a storage unit 430, an input unit 440, and a display unit 450.

The controller 410 generates one or more image files (hereinafter referred to as layers) that are input through the input unit 440 as final cartoon content in consideration of an input effect, property information of the effect, etc. The controller 410 may generate the final cartoon content such that a plurality of layers input by a user may be expressed to include the effect set by the user. When a plurality of layers included in one cut is set to have a perspective effect, the controller 410 may generate a final cut to move according to depth information of the respective layers with respect to individual movement degrees and directions. When a plurality of layers included in one cut is set to have a time difference effect which causes a plurality of layers included in the cut to move at different times or at different speeds, the controller 410 may generate a final cut to move according to initial or final locations of the respective layers with respect to individual moving paths and speeds. The controller 410 may determine the moving speed of the cartoon content according to property information of one or more cuts included in a piece of cartoon content. The controller 410 may determine the moving speed of the cartoon content according to an effect of a cut displayed on a predetermined region of a display region, and property information in relation to the predetermined region. The controller 410 may display the cartoon content not to move but stop even if a user event is input.

The communication unit 420 may include one or more components that enable communication between the cartoon content generation apparatus 400 and the cartoon content server 100. For example, the communication unit 420 may include a short-distance wireless communication unit or a mobile communication unit. Examples of the short-range wireless communication unit may include, but are not limited to, a Bluetooth communication unit, a Bluetooth low energy (BLE) communication unit, a near-field communication unit, a WLAN (Wi-Fi) communication unit, a Zigbee communication unit, an infrared data association (IrDA) communication unit, a Wi-Fi direct (WFD) communication unit, a ultra-wideband (UWB) communication unit, an Ant+ communication unit, etc. The mobile communication unit may exchange a radio signal with at least one among a base station, an external terminal, and a server in a mobile communication network. The radio signal may include a voice call signal, a video communication call signal, or various types of data via transmission and reception of text/multimedia messages. The communication unit 420 may communicate with the cartoon content server 100 to obtain the cartoon content or an application for displaying the cartoon content from the cartoon content server 100.

The storage unit 430 stores the cartoon content obtained through the communication unit 420.

The input unit 440 is a means used by a user to input an event or data for controlling the cartoon content generation apparatus 400. For example, the input unit 440 may include a key pad, a dome switch, a touch pad (of a contact capacitive type, a press resistive type, an infrared sensing type, a surface ultrasonic conductive type, an integration tension measurement type, or a piezo effect type), a jog wheel, a jog switch, etc. but is not limited thereto.

The input unit 440 obtains a user input. For example, the input unit 440 may obtain a user event with respect to the cartoon content, a scroll input, a direction key input, a movable touch input having a predetermined direction.

The display unit 450 displays a user interface for generating the cartoon content. The display unit 450 may display the user event that is input through the input unit 440 and a cut and a layer added by the user according to the user interface. When the display unit 450 is configured with a touch screen in which a touch pad forms a layer structure, the display unit 450 may be used as an input device in addition to an output device. The display unit 450 may include at least one of a liquid crystal display (LCD), a thin film transistor-liquid crystal display (TFT-LCD), an organic light-emitting diode (OLED) display, a flexible display, a 3D display, and an electrophoretic display.

Figure 3:
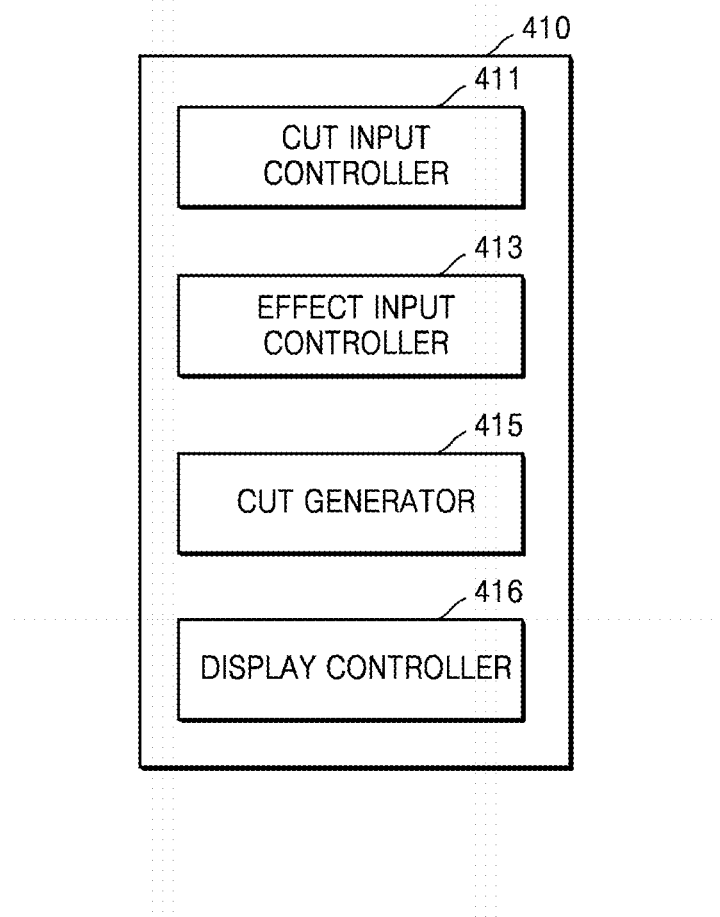
FIG. 3 is a block diagram of a controller of FIG. 2.

FIG. 3 is a block diagram of the controller 410.

Referring to FIG. 3, the controller 410 includes a display controller 416, a cut input controller 411, an effect input controller 413, and a cut generator 415.

The cut input controller 411 controls a cut and property information of the cut, which are to be added by a user, to be input into generated cartoon content. In this regard, the cut may include one or more layers. The property information of the cut may include the horizontal length of the cut, the vertical length, the shape, and the importance set by a creator. The cut may be data included in the cartoon content and may be configured to express one scene among the cartoon content. In this regard, the layer may be 2D data included in the cut and include an image or text.

In another exemplary embodiment, the cut input controller 411 may further include a layer input controller (not shown) that controls one or more layers that need to be included in a cut added or selected by the user to be input. The cut input controller 411 may control the layers to be included in the cut in correspondence with a layer addition event that occurs by the user.

The effect input controller 413 may control the type of an effect that needs to be included in the one or more layers included in one cut to be input. In this regard, the type of the effect indicates an animation operation included in the layers and may include a movement of the layers, division, going down, going up, expansion, a slow movement, a fast movement, an operation causing a color change, a perspective effect of a cut, a movement set while individual time intervals, rotation, transparent processing, rescaling, and setting a clipping region, but is not limited thereto.

The effect input controller 413 controls different property information to be input according to the type of the effect. For example, when an effect that moves (hereinafter referred to as a moving effect) is input to a layer, the effect input controller 413 may control initial and final locations, start and end time, etc. that are necessary for the moving effect to be input.

When an effect that displays a perspective between layers (hereinafter referred to as a perspective effect) is input, the effect input controller 413 may control depth information of layers and an occurrence time of the perspective effect that are necessary for the perspective effect to be input. When an effect that changes a color (hereinafter referred to as a color change effect) is input to a layer, the effect input controller 413 may control information regarding a color change time or point, a first color that is initial color information, a second color that is changed color information to be input.

When an effect that moves slower than speed corresponding to a user event is input to a layer, the effect input controller 413 may input initial and final locations, start and end time, etc., like the movement of the layer, and may set a moving speed as one of 2 times (2×), 3 times (3×), ½ time, and ⅓ time.

In other exemplary embodiments, when an effect that sets a clipping region is input to a layer, the effect input controller 413 may further receive clipping region information in correspondence with a clipping region setting effect. In this regard, the clipping region information may be referred to as a region directed as a clipping effect in correspondence with a user event and may be set to include at least partial region of the layer. The clipping region information may be set in relation to a boundary of the layer.

In other exemplary embodiments, the effect input controller 413 may further receive importance of layers included in a cut and speed property information. In this regard, the importance may be information arbitrarily set by a cartoonist based on a portion of layers or cuts that occupies in the entire work.

In other exemplary embodiments, the effect input controller 413 may further include an additional layer displayed in correspondence with a user event in a reverse direction. The additional layer may not be displayed in correspondence with a user event in a forward direction but may be displayed in correspondence with the user event in the reverse direction.

In other exemplary embodiments, the effect input controller 413 may further include an effect display start time. In this regard, the effect display start time may be set as one of a display start time, a page start time, a previous effect end time, and a simultaneous time with respect to a previous effect but is not limited thereto.

In other exemplary embodiments, the effect input controller 413 may receive property information "stop when an effect is displayed" as effect property information.

The cut generator 415 generates a final cut such that a first layer including the moving effect may move a moving distance between initial and final locations in correspondence with a user event. The cut generator 415 may generate the final cut such that a second layer including the perspective effect may periodically move along a depth of the second layer. The cut generator 415 may generate the final cut such that a third layer including the color change effect may be changed from the first color to the second color in relation to an input change time. The cut generator 415 may generate the final cut such that a fourth layer including the effect that moves slower than speed corresponding to a user event may move at the moving speed in correspondence with the user event.

In other exemplary embodiment, the cut generator 415 may control receiving of initial and final locations of a plurality of layers in correspondence with a time difference effect which move while individual time intervals or move at individual speeds, determine moving speeds of the respective speeds based on distance differences between the initial and final locations of the plurality of layers, and generate the final cut such that the plurality of layers may individually move at the moving speeds.

In other exemplary embodiments, the cut generator 415 may generate final layers such that the plurality of layers may have movement degrees and directions based on layers of the respective layers.

The cut generator 415 may determine a reaction speed of a layer in consideration of layer information of a cut, speed property information, number of text, effect information, importance, number of layers, a screen size, and a space between the cut and a previous cut, and generate a final cut such that the layer may be reproduced at the reaction speed. The cut generator 415 may preferably determine a moving speed of cartoon content for each section according to an effect of a cut displayed on a predetermined region of a display region, and property information of the cut and generate a final cut such that at least one layer included the cut displayed may move at the moving speed for each section. Here Section is equally or unequally divided time interval to the total time which cuts or layers are displayed to a predetermined number.

For example, the cut generator 415 may increase an expression time of a cut including layers of which number is greater than a preset threshold value by increasing a reproduction time of the cut. To this end, the cut generator 415 may reduce a reaction speed, i.e. a moving distance or a moving speed, corresponding to a user event while the cut is displayed. That is, the cut including a great number of layers may be expressed to move slowly.

For example, the cut generator 415 may allow a user to sufficiently recognize text included in a cut by increasing a reproduction time of the cut including a great number of the text. To this end, the cut generator 415 may reduce a reaction speed, i.e. a moving distance or a moving speed, corresponding to a user event while the cut is displayed.

For example, the cut generator 415 may allow effects included in a cut to be sufficiently displayed to a user by increasing a reproduction time or display time of the cut including great number, types, and size of the effects. To this end, the cut generator 415 may reduce a reaction speed, i.e., a moving distance or a moving speed, corresponding to a user event while the cut is displayed.

In alternative exemplary embodiments, the cut generator 415 may set threshold values of respective set values in consideration of a vertical length of a cut, when layer information of the cut, speed property information, number of words included in text, effect information, importance, number of layers, a screen size, a space between the cut and a previous cut, etc. exceed the threshold values, determine that a reaction speed of the layer is slower than a general level or speed corresponding to a user event, and generate a final cut such that the layer may be reproduced or be displayed at the reaction speed. For example, the cut generator 415 may set threshold values of a first cut having a first length smaller than those of a second cut having a second length longer than the first length, and when property information of the first cut exceeds the respective threshold values, determine a slow reaction speed of the first cut. The cut generator 415 may increase a moving speed or distance of the first cut such that a moving effect included in the first cut having a vertical length shorter than that of the second cut may be sufficiently recognized by the user.

In alternative exemplary embodiments, the cut generator 415 may generate a final cut that is stopped and displayed irrespective of a user event even if the user event is input, in correspondence with property information "stop when the effect is displayed" of an effect.

In alternative exemplary embodiments, the cut generator 415 may generate a final cut according to a display start time of an effect included in a cut.

The display controller 416 provides a user interface for generating cartoon content through the display unit 450. The display controller 416 may control to display the user interface for generating the cartoon content and adding a cut and a layer and display an effect setup menu that may be included in the layer.

The cartoon content generation apparatus 400 according to the exemplary embodiments may set an effect with respect to one or more layers included in a cut, convert the respective layers that are to be reproduced to include the effect, and generate a final cut including the converted layers.

Figure 4:
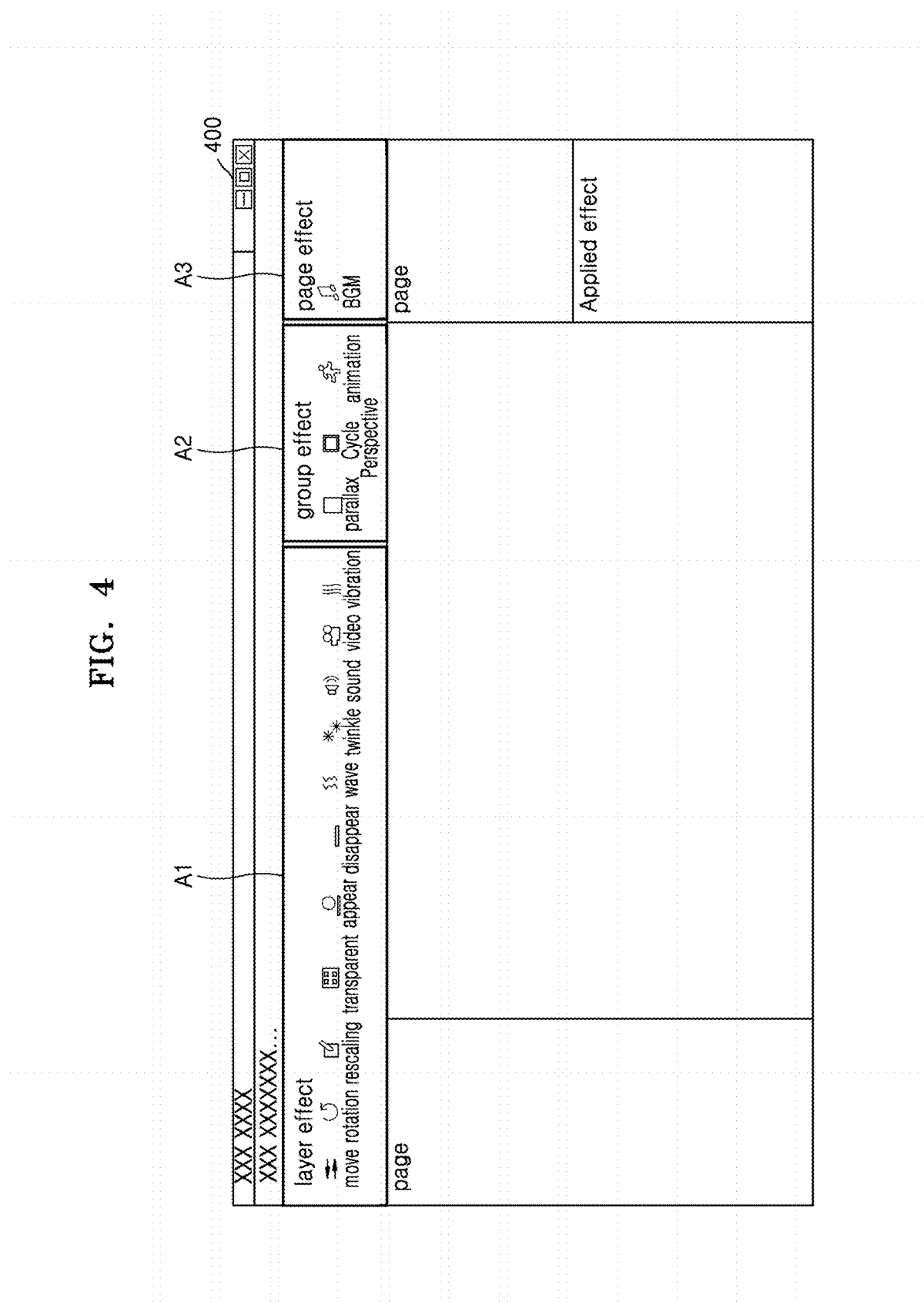
FIG. 4 shows an example of a user interface of a cartoon content generation apparatus.

FIG. 4 shows an example of a user interface 400 of the cartoon content generation apparatus 400.

The cartoon content generation apparatus 400 may provide an effect selection window A1 including an effect applicable to a layer, a group effect selection window A2 including an effect applicable to a plurality of layers, and a page effect selection window A3 including an effect applicable to a cut to a part of the screen.

The group effect selection window A2 may include a parallax button that applies a time difference effect which moves while individual time intervals, a perspective providing button that applies a perspective effect, and animation.

Figure 5:
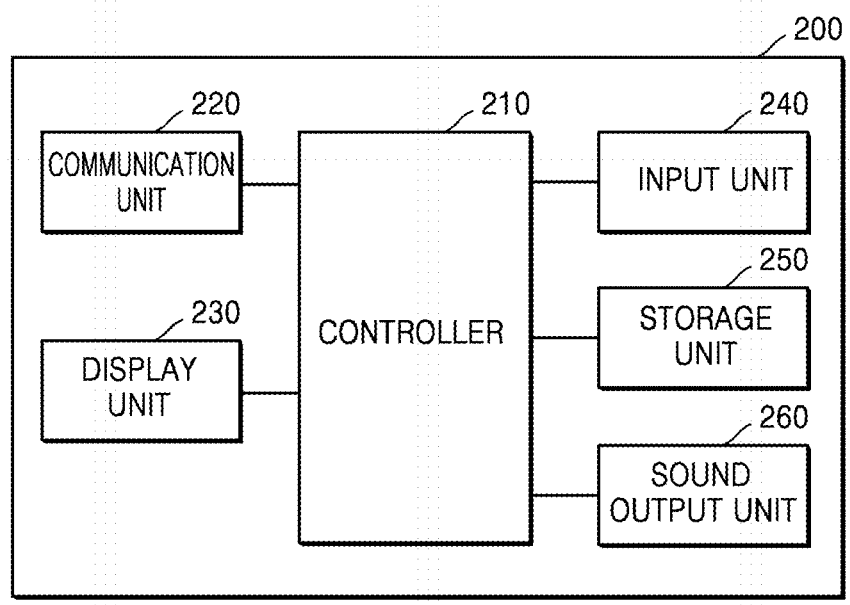
FIG. 5 is a block diagram of a cartoon content display apparatus according to an exemplary embodiment.

FIG. 5 is a block diagram of the cartoon content display apparatus 200 according to an exemplary embodiment.

Referring to FIG. 5, the cartoon content display apparatus 200 includes a controller 210, a communication unit 220, a display unit 230, an input unit 240, a storage unit 250, and a sound output unit 260.

The controller 210 controls to display cartoon content through the display unit 230. The controller 210 controls to appropriately display the cartoon content generated by the cartoon content generation apparatus 400. That is, the controller 210 controls to display the cartoon content generated by the cartoon content generation apparatus 400 as set by a cartoonist.

In alternative exemplary embodiments, the controller 210 may control the moving speed or distance of the cartoon content such that one or more cuts included in the cartoon content, one or more layers included in the cut, and an effect applied in a layer or cut unit may be appropriately displayed.

In more detail, the controller 210 may calculate not only the moving speed or distance of the cartoon content in correspondence with an input time or direction of a user event (for example, a scroll input, a direction key input, or a moving touch input) but also the moving speed or distance of the cartoon content in further consideration of property information of a cut or a layer, number of words included in text of the cut or the layer, etc. In other exemplary embodiments, the controller 210 may calculate the moving speed or distance of the cartoon content in further consideration of an average reading speed of the cartoon content, an average reading speed of a user, an average reading speed of a cartoon having the same genre as that of the cartoon content, an average reading speed of a cartoon of a cartoonist of the cartoon content, etc.

The communication unit 220 may include one or more components that enable communication between the cartoon content display apparatus 200 and the cartoon content server 100. For example, the communication unit 220 may include a short-distance wireless communication unit or a mobile communication unit. Examples of the short-range wireless communication unit may include, but are not limited to, a Bluetooth communication unit, a Bluetooth low energy (BLE) communication unit, a near-field communication unit, a WLAN (Wi-Fi) communication unit, a Zigbee communication unit, an infrared data association (IrDA) communication unit, a Wi-Fi direct (WFD) communication unit, a ultra-wideband (UWB) communication unit, an Ant+ communication unit, etc. The mobile communication unit may exchange a radio signal with at least one among a base station, an external terminal, and a server in a mobile communication network. The radio signal may include a voice call signal, a video communication call signal, or various types of data via transmission and reception of text/multimedia messages. The communication unit 220 may communicate with the cartoon content server 100 to obtain the cartoon content or an application for displaying the cartoon content from the cartoon content server 100.

The input unit 240 is a means used by a user to input data for controlling the cartoon content display apparatus 200. For example, the input unit 240 may include a key pad, a dome switch, a touch pad (of a contact capacitive type, a press resistive type, an infrared sensing type, a surface ultrasonic conductive type, an integration tension measurement type, or a piezo effect type), a jog wheel, a jog switch, etc. but is not limited thereto.

The input unit 240 obtains a user input. For example, the input unit 240 may obtain a user event with respect to the cartoon content, a scroll input, a direction key input, a movable touch input having a predetermined direction.

The display unit 230 displays the cartoon content and displays the cartoon content by moving the cartoon content in correspondence with the user event with respect to the cartoon content. The display unit 230 may display the cartoon content by moving the cartoon content according to the moving speed and distance in consideration of the user event and the property information of the cartoon content. When the display unit 230 is configured with a touch screen in which a touch pad forms a layer structure, the display unit 230 may be used as an input device in addition to an output device. The display unit 230 may include at least one of a liquid crystal display (LCD), a thin film transistor-liquid crystal display (TFT-LCD), an organic light-emitting diode (OLED) display, a flexible display, a 3D display, and an electrophoretic display.

The storage unit 250 stores the cartoon content obtained through the communication unit 220.

The sound output unit 260 outputs audio data received from the communication unit 220 or stored in the storage unit 250. The sound output unit 260 may output sound signals relating to effect sound and background sound included in the cartoon content. The sound output unit 260 may include a speaker, a buzzer, etc.

The sound output unit 260 may further include a vibration motor (not shown). The vibration motor may output a vibration signal. For example, the vibration motor may output the vibration signal corresponding to an output of audio data or image data (for example, the effect sound and the background sound included in the cartoon content). The vibration motor may also output the vibration signal when a touch is input to the touch screen of a display unit 230.

Figure 6:
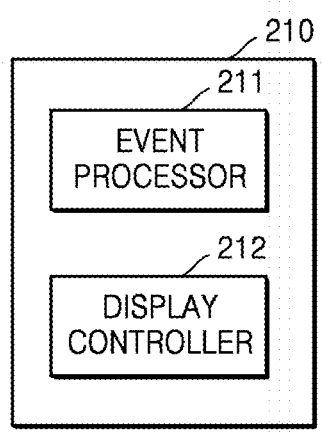
FIG. 6 is a block diagram of a controller of FIG. 5.

FIG. 6 is a block diagram of the controller 210.

Referring to FIG. 6, the controller 210 includes an event processor 211 and a display controller 212.

The event processor 211 may calculate the moving distance or speed of cartoon content corresponding to a user event that is input through the input unit 240 or process the user event according to the calculated moving distance of speed. The event processor 211 calculates the moving speed or distance of a cut included in a display region in correspondence with the user event. The event processor 211 calculates the moving distance or speed of the cartoon content in correspondence with the user event and allow the cartoon content to move at the moving speed by the moving distance. The event processor 211 may calculate the moving speed or distance in consideration of input time and direction of the user event, i.e., a scroll input, a direction key input, and a movable touch input.

In more detail, the event processor 211 may move the cartoon content by a first moving distance in a progress direction corresponding to a clock direction. When a touch input having a movement in a vertical direction and a second input time is input, the event processor 211 may set a direction of the touch input as a moving direction and calculate a second moving distance corresponding to a length of the touch input. The event processor 211 may calculate a first moving speed using the second moving distance and the second input time. The event processor 211 may calculate a moving speed based on a moving distance and an input time of the user event. The event processor 211 may calculate the moving speed based on the moving distance and the input time of the user event and increase or reduce the moving speed in consideration of property information of the cut or a layer included in the display region.

In alternative exemplary embodiments, the event processor 211 may consider property information of a cut or a layer included in the cartoon content when calculating the moving speed or distance of the cartoon content. When the cut included in the display region includes a great number of layers, effects, or words included in text, the event processor 211 may reduce the moving speed or distance of the cartoon content in order to increase an expression time of the cut.

The event processor 211 may increase the moving speed or distance of the cartoon content according to speed set information of a cut or a layer included in a display region. In this regard, the moving speed or distance of the cartoon content may be determined in relation to an effect or property information of a cut or a layer displayed on a predetermined region of the display region. In this regard, the cut or the layer displayed on the predetermined region of the display region may be a representative cut or layer. For example, the representative cut or layer may be a first cut or layer of the display region or a center cut or layer thereof but is not limited thereto.

In alternative exemplary embodiments, the event processor 211 may calculate the moving speed or distance of the cartoon content in consideration of an average reading speed of the cartoon content, an average reading speed of the user, etc. In this regard, the average reading speed of the user may be the moving speed of the cartoon content and may be calculated by using an accumulatively stored cartoon content moving speed of users. For example, when a first user reads one page of cartoon content for three minutes, whereas a second user reads one page of the same cartoon content for six minutes, the event processor 211 may increase the moving speed or distance of the cartoon content in consideration of a reading speed of the first user higher than that of the second user. In other exemplary embodiments, the event processor 211 may calculate reading ability of users according to users, works, genres, ages, and genders. For example, since a thriller cartoon is generally viewed at a speed faster than that of a comic cartoon, the event processor 211 may reduce the moving speed or distance of the cartoon content with respect to the thriller cartoon.

The event processor 211 may change the display of the cartoon content in consideration of a specification of a user terminal. When the user terminal has a large screen, the user terminal displays a great amount of data at a time, and the user has a high data recognition rate compared to a small screen, the event processor 211 may increase the moving speed or distance of the cartoon content according to a screen size of the user terminal.

The event processor 211 may calculate a moving distance based on an input length of a user event. In this regard, the input length may include a rotation number of the user event, i.e. a scroll input, a frequency and time of a direction key input, and a touch length of a touch input.

The display controller 212 displays the movement of the cartoon content that moves a moving distance corresponding to the user event at a moving speed corresponding to the user event in correspondence with the user event and allows the display region to be changed in correspondence with the movement. That is, the display controller 212 controls to move the cartoon content from a first region of the cartoon content by the moving distance at the moving speed and controls to finally display a second region of the cartoon content.

In alternative exemplary embodiments, the display controller 212 may control to display the display region according to property information of a cut or layer of the display region.

In alternative exemplary embodiments, the display controller 212 may control to set threshold values of respective set values in consideration of a vertical length of a cut, when layer information of the cut, speed property information, number of words included in text, effect information, importance, number of layers, a screen size, a space between the cut and a previous cut, etc. exceed the threshold values, control to determine that a reaction speed of the layer is slower than a general level, and control to reproduce the cut at the reaction speed. For example, the display controller 212 may set threshold values of a first cut having a first length smaller than those of a second cut having a second length longer than the first length, and when property information of the first cut exceeds the respective threshold values, determine a slow reaction speed of the first cut. The display controller 212 may increase a moving speed or distance of the first cut such that a moving effect included in the first cut having a vertical length shorter than that of the second cut may be sufficiently recognized by the user.

In alternative exemplary embodiments, the display controller 212 may not allow the cartoon content to correspond to an input user event in consideration of property information of an effect included in a cut and may stop and display the cartoon content until a predetermined period of time elapses or a predetermined user event is input.

The display controller 212 may calculate a movement path between initial and final locations of a cut or a layer including a moving effect or time difference effect and control the layer to move along the movement path. In this regard, a moving speed used to move the moving distance may be set by the cartoon content generation apparatus 400 in consideration of a distance difference between the initial and final locations set by a user who creates the cartoon content, i.e. a cartoonist or a ratio between vertical lengths of the cur or the layer. For example, when a layer including location information is displayed, the display controller 212 may control the layer to move a path between initial and final locations of the layer at the set moving speed.

The display controller 212 may control displaying of layers in a movement considering depth information of cuts or layers including a perspective effect. The display controller 212 may calculate movement directions and degrees of the respective layers in consideration of depths of the layers and control moving of the respective layers in a movement of the calculated movement directions and degrees. In this regard, although the movement directions are random directions, the movement directions may be determined in consideration of movement directions of layers of adjacent depths. The display controller 212 may determine a movement degree of a layer of an Nth depth in consideration of the movement directions of layers of adjacent depths. For example, the movement degree of the layer of the Nth depth may be smaller than that of a layer of an N−1th depth and may be greater than that of a layer of an N+1th depth.

The display controller 212 may control to display respective cuts or layers including other effects according to speed information, vibration information, color information, etc. of the cuts or the layers.

The display controller 212 may control to display a layer included in a cut by adjusting a display location of the layer included in a display region in consideration of a display rate of the cut. For example, when the display rate is 10 percent, the display controller 212 may display the layer included in the cut by adjusting a location of the layer to an initial location, and, if the display rate increases from 10 percent to 50 percent according to a user event, may display the layer by adjusting the location of the layer to move from 10 percent of a moving path to 50 percent thereof.

The display controller 212 may adjust a display rate of a cut in correspondence with a user event, and, when the display rate satisfies a predetermined condition, control to display a layer included in a cut by changing a color of the layer. For example, when the display rate is 50 percent, the display controller 212 may control to change the color of the layer that is set to be changed from a sky color to a black color according to the display rate of the cut.

When the display rate satisfies the predetermined condition in correspondence with the user event, the display controller 212 may control to make the layer included in the cut disappear. For example, when the display rate of the cut is more than 80 percent, the display controller 212 may control to make the layer, that is set to disappear according to the condition, disappear.

The display controller 212 may control moving of not only a layer in correspondence with the user event but also a layer that has completely moved in correspondence with the user event. For example, the display controller 212 may display the layer that is set to include a perspective effect to have a periodic movement when the cartoon content including the layer stops moving or when no user input is entered. The display controller 212 may control the movement of the layer, which is set to move along a first path when the cartoon content including the layer is stopped.

The display controller 212 may control to display a second region of the cartoon content that moves in a reverse direction by a moving distance from a first region of the cartoon content that is a current display region in correspondence with a user event in the reverse direction and control to display the second region to further include an additional layer. In this regard, the additional layer that is not displayed in correspondence with a user event in a forward direction may be an advertisement layer relating to an object included in the second region or may be a layer set by a cartoon content creator. For example, when the user event in the reverse direction is input to the cartoon content, the display controller 212 may change a display region in correspondence with the user event in the reverse direction while further including, in a cut included in the display region, a layer including advertisement information regarding beverage, Ramen, and household appliances, a foreshadow item informing content of a next episode, a fear item that may give a new message, etc. that are not displayed in correspondence with the user event in the forward direction.

Figure 7:
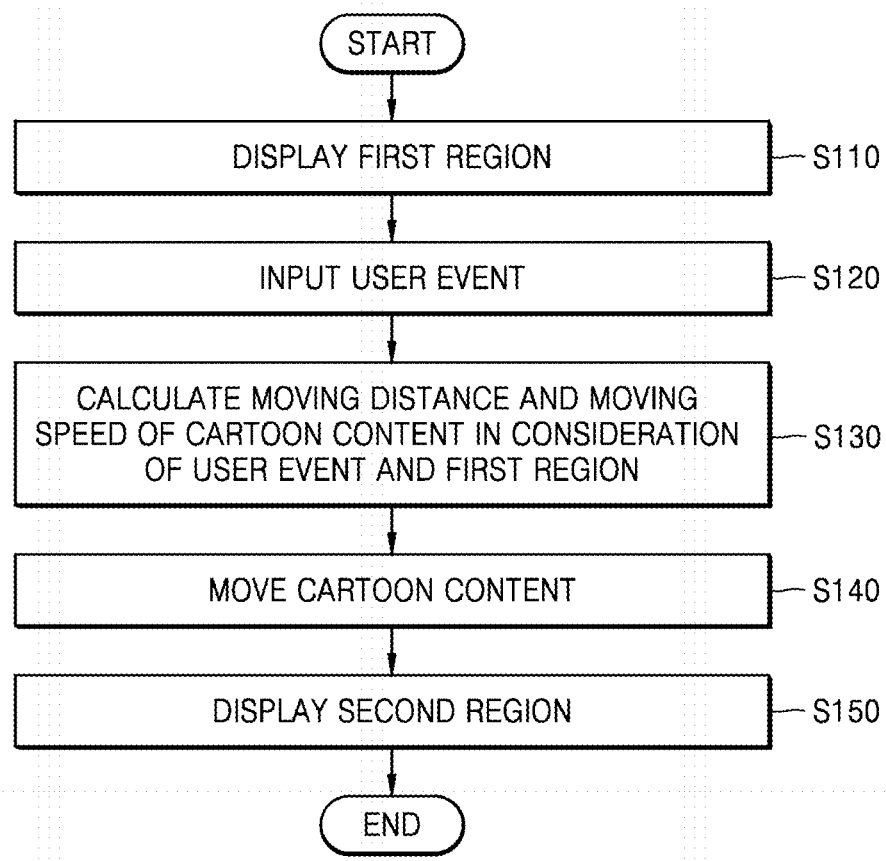
FIG. 7 is a flowchart of a cartoon content display method according to one exemplary embodiment.

FIG. 7 is a flowchart of a cartoon content display method according to one exemplary embodiment.

Referring to FIG. 7, the cartoon content display method according to the exemplary embodiment is a method of displaying cartoon content in correspondence with a user event and includes an operation S110 of displaying a first region, an operation S120 of inputting the user event, an operation S130 of calculating the moving distance and the moving speed of the cartoon content in consideration of the user event and the first region, an operation S140 of moving the cartoon content, and an operation S150 of displaying a second region.

In operation S110, the display unit 230 displays the first region of the cartoon content.

In operation S120, the input unit 240 receives the user event, a scroll input, a direction key input, and a moving touch input from a user.

In operation S130, the event processor 211 calculates a first speed corresponding to the user event, calculate a second speed corresponding to an effect of a first cut located in at least a part of the first region, and a third speed corresponding to an effect of a second cut located in at least a part of the first region. The event processor 211 may calculate the moving distance or the moving speed of the cartoon content in correspondence with the user event or in consideration of an effect included in the first region.

In operation S140, the display controller 212 may control to display the cartoon content by moving the cartoon content at the second speed while the first cut is displayed on a predetermined region of a screen and then at the third speed while the second cut is displayed on the predetermined region. The display controller 212 may control to display a first effect included in the first cut while moving at the second speed and a second effect included in the second cut while moving at the third speed. The display controller 212 may control to display a movement of the cartoon content that moves at the moving speed in correspondence with the user event, change a display region in correspondence with the movement, and sequentially display one or more effects included in a cut of the display region in correspondence with the movement.

In operation S150, the display controller 212 may display the second region of the cartoon content moved from the first region by the moving distance.

Figure 8:
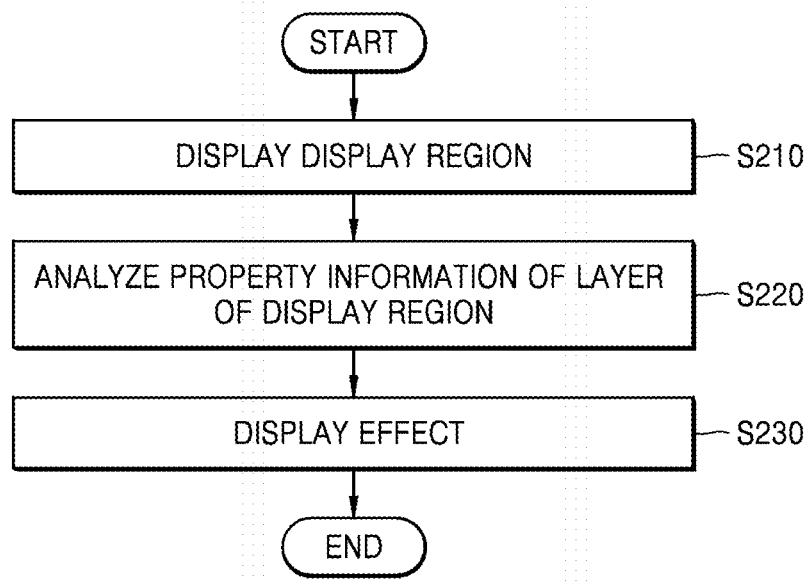
FIG. 8 is a flowchart of a cartoon content display method according to another exemplary embodiment.

FIG. 8 is a flowchart of a cartoon content display method according to another exemplary embodiment.

Referring to FIG. 8, the cartoon content display method according to the exemplary embodiment may be a method of displaying cartoon content according to property information of a cut or a layer and includes an operation S210 of displaying a display region, an operation S220 of analyzing property information of a layer of the display region, and an operation S230 of displaying an effect included in the layer.

In operation S210, the cartoon content display apparatus 200 moves the cartoon content in correspondence with the user event that is input through the display controller 212 and display a part of the cartoon content. The event processor 211 calculates a moving speed or a moving distance of the cartoon content in correspondence with the user event and controls to move the cartoon content at the moving speed by the moving distance. In operation S220, the event processor 211 analyzes the property information of the layer included in the display region of the cartoon content. In this regard, the property information of the layer is described above and thus a detailed description thereof is omitted.

In operation S230, the event processor 211 analyzes the property information and determines the effect included in the layer. In operation S230, the display controller 212 allows an operation corresponding to the effect to be displayed. For example, when property information of the effect includes "when the effect is displayed, stop", the display unit 230 may allow the cartoon content to not move while the effect is displayed according to the property information. The display controller 212 may determine whether the user event or an elapsed time satisfies a first condition, and, when the user event or the elapsed time satisfies the first condition, move the cartoon content again in correspondence with an input user event. For example, when the display unit 230 displays a cut including the effect during a preset elapsed time, i.e. during more than 10 seconds, the cartoon content display apparatus 200 may move the cartoon content again in correspondence with the input user event, and when the input unit 240 receives a user event corresponding to an input length more than 200 percent of a vertical length of the display region, the cartoon content display apparatus 200 may move the cartoon content again in correspondence with the input user event.

Figure 9:
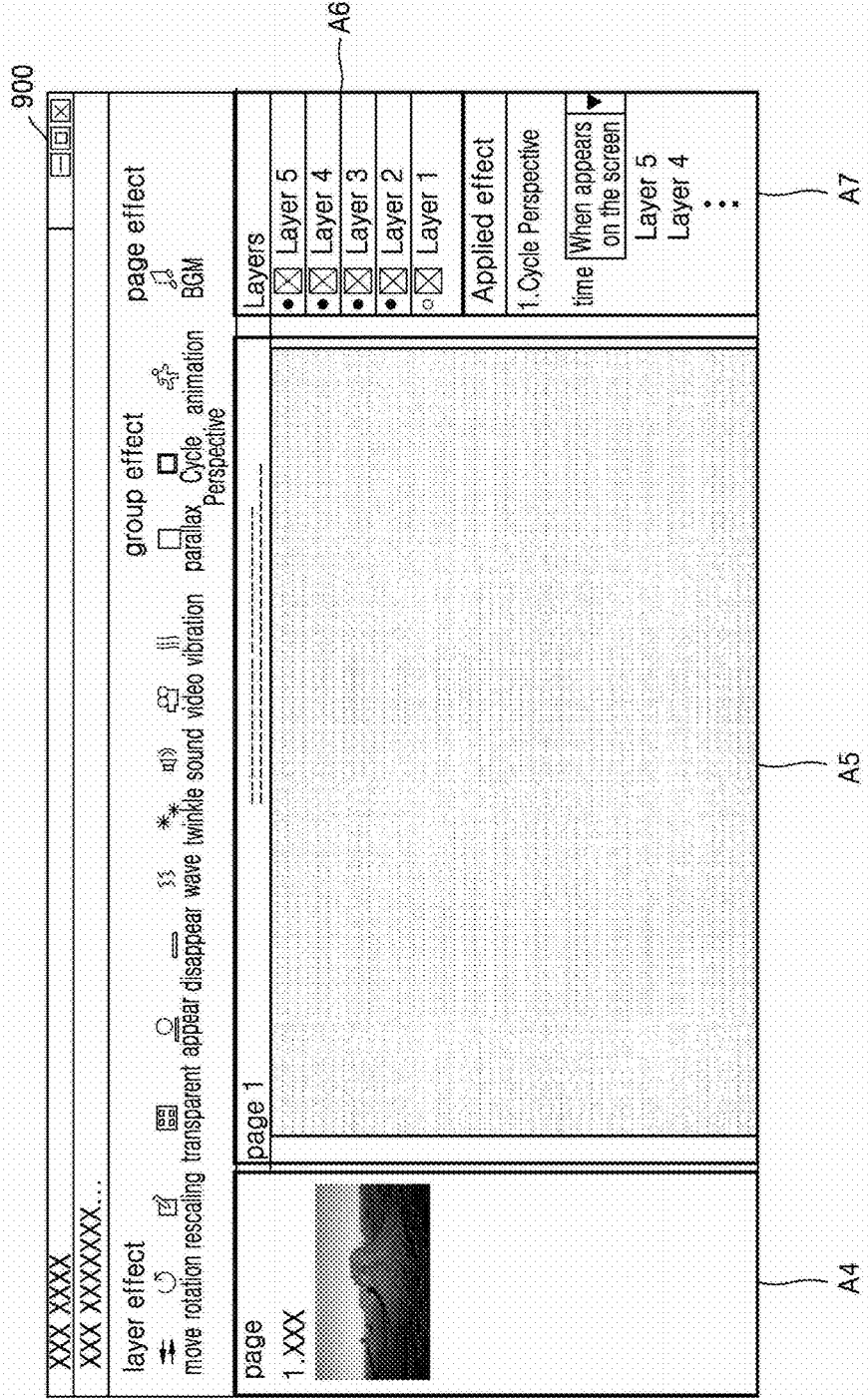
FIG. 9 shows an example of a user interface to which a perspective effect of the cartoon content generation apparatus of FIG. 4 is applied.
Figure 10:
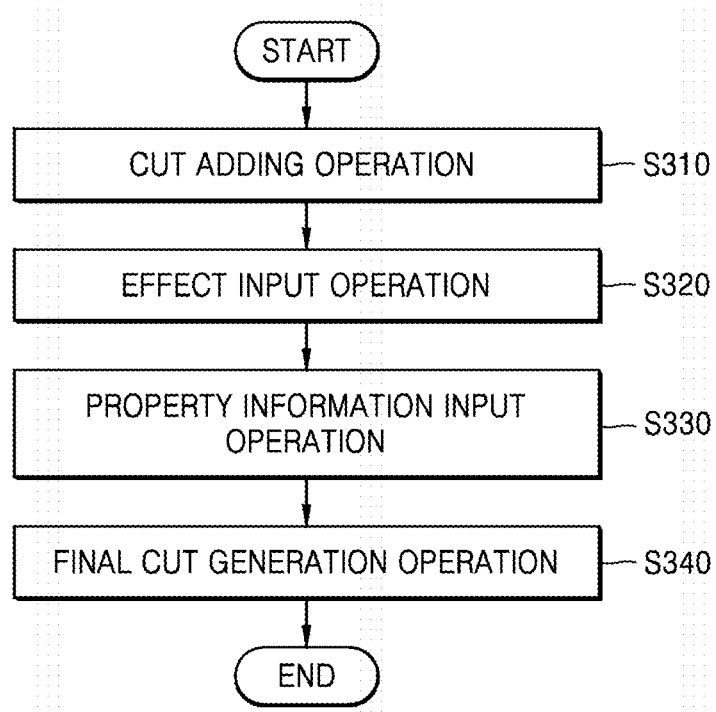
FIG. 10 is a flowchart of a cartoon content generation method according to yet another exemplary embodiment.
Figure 11:
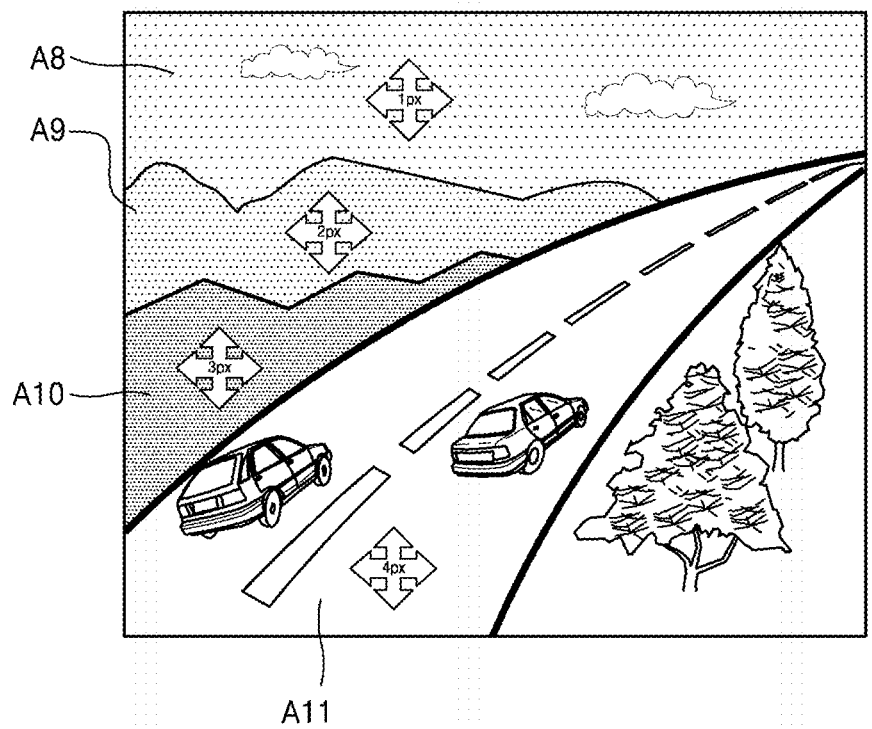
FIG. 11 shows an example of a plurality of layers including a perspective effect.

FIGS. 9 through 11 are diagrams relating to a perspective effect applied to the exemplary embodiments.

FIG. 9 shows an example of a user interface to which a perspective effect of the cartoon content generation apparatus 400 is applied.

Referring to FIG. 9, when a user applies the perspective effect to a plurality of layers included in a cut, the cartoon content generation apparatus 400 may display the screen including a preview window A4, a cut preview window A5, a layer display window A6, and an information input window A7.

The cut preview window A5 may preview a cut selected by a cartoonist. The layer display window A6 may sequentially display layers included in the cut. When the user selects the perspective effect, the information input window A7 may receive information related to the perspective effect through a displayed window.

The user may input an application time of the perspective effect and depth information through the information input window A7. In this regard, the application time of the perspective effect may be one of a time when the layer including the perspective effect appears on a screen, a time when a page starts, a simultaneous time with respect to a previous effect, and a time when the previous effect ends.

FIG. 10 is a flowchart of a cartoon content generation method according to another exemplary embodiment.

Referring to FIG. 10, the cartoon content generation method according to the exemplary embodiments includes a cut adding operation S310, an effect input operation S320, a property information input operation S330, and a final cut generation operation S340.

In operation S310, the input unit 440 receives a signal that adds a cut that is to be added to cartoon content.

In operation S320, the input unit 440 receives an effect selection signal including a type of an effect that is to be applied to the cut. The input unit 440 receives a signal that selects one of an effect applied to one layer and an effect applied to a plurality of layers.

In operation S330, the input unit 440 receives property information according to the type of the effect. For example, when a perspective effect is input between layers, the effect input controller 413 may control inputting of depth information of layers necessary for the perspective effect and a time when the perspective effect occurs.

In another exemplary embodiment, the effect input controller 413 may further receive importance of layers included in a cut and speed property information. In this regard, the importance may be information arbitrarily set by a cartoonist based on a portion of layers that occupies in the entire work.

In other exemplary embodiments, the cartoon content generation apparatus 400 may further include an additional layer displayed in correspondence with a user event in a reverse direction. The additional layer may not be displayed in correspondence with a user event in a forward direction but may be displayed in correspondence with the user event in the reverse direction.

In operation S340, the cut generator 415 may generate a final cut to express the cut according to the type of the input effect and property information.

FIG. 11 shows an example of a plurality of layers A8, A9, A10, and A11 including a perspective effect.

As shown in FIG. 11, one cut may include the plurality of layers A8, A9, A10, and A11 that may have different distance differences. Referring to FIG. 11, the first layer A8 may include a sky image, the second layer A9 may include a far mountain image, the third layer A10 may include a near mountain image, and the fourth layer A11 may include a nearest road and car image. That is, the first through fourth layers A8, A9, A10, and A11 may be layers that are to be expressed according to a distance difference from a point of view of a user viewing the cartoon. A cartoonist may set fourth through first layers with respect to the first through fourth layers A8, A9, A10, and A11, respectively. The cartoon content display apparatus 200 may control the first through fourth layers A8, A9, A10, and A11 to have movements with reference to depth information of the first through fourth layers A8, A9, A10, and A11. That is, the first layer may be provided to the nearest present fourth layer A11, the movement of the fourth layer A11 may be set in consideration of the first layer, the fourth layer that is the greatest value may be provided to the farthest present first layer A8, and the movement of the first layer A8 may be set in consideration of the fourth layer. The second layer A9 and the third layer A10 may respectively have the third layer and the second layer, and the movements of the layers A8, A9, A10, and A11 may be determined according to the fourth through first layers. The movements provided in consideration of the fourth through first layers may be values considering movements of adjacent layers. Although directions of movement of each layer are random, an Nth layer may have a movement smaller than that of an N−1th layer and greater than that of an N+1th layer.

FIGS. 12 through 15 are diagrams relating to a time difference effect.

Figure 12:
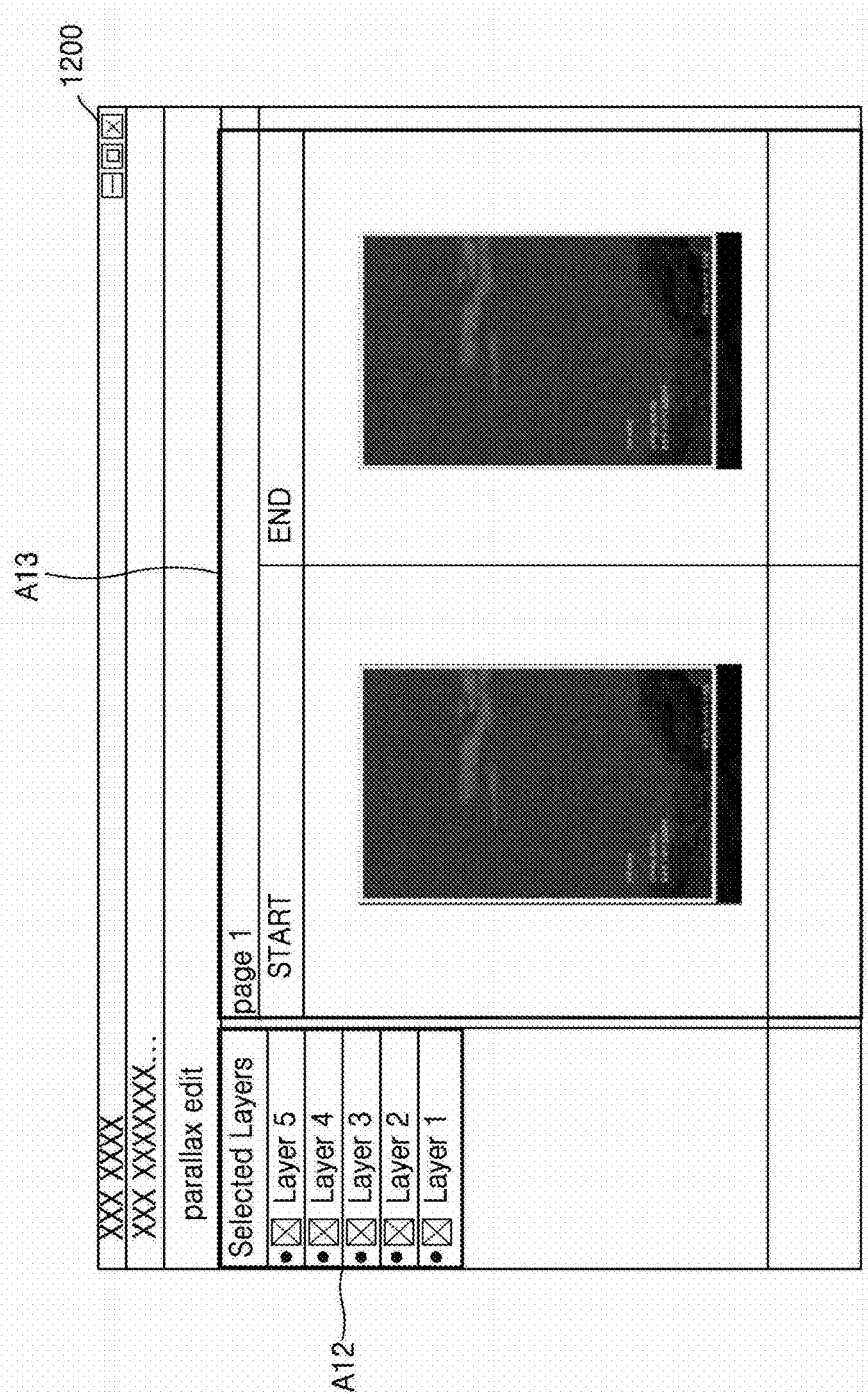
FIG. 12 shows an example of a user interface to which a time difference effect of the cartoon content generation apparatus of FIG. 4 is applied.

FIG. 12 shows an example of a screen to which a time difference effect of the cartoon content generation apparatus 400 is applied.

When a user applies the time difference effect to a plurality of layers included in a cut, the cartoon content generation apparatus 400 may display the screen including a layer display window A12 and an information input window A13.

The layer display window A12 may display a plurality of selected layers and select a layer in which information is to be input from the plurality of selected layers. The information input window A13 may input initial and final locations of a layer selected by a user.

The user may input initial and final locations of the respective layers through the information input window A13.

Figure 15:
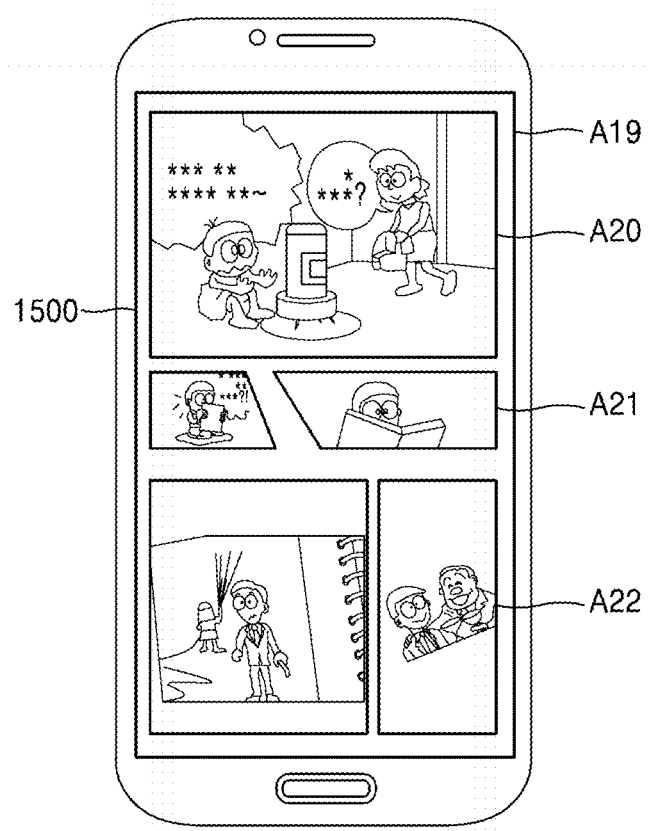
FIG. 15 shows an example of a user interface that displays cartoon content.

As shown in FIG. 12, the cartoon content generation apparatus 400 may receive initial and final location of a plurality of layers and, as shown in FIG. 15, may allow the plurality of layers to individually move.

Figure 13:
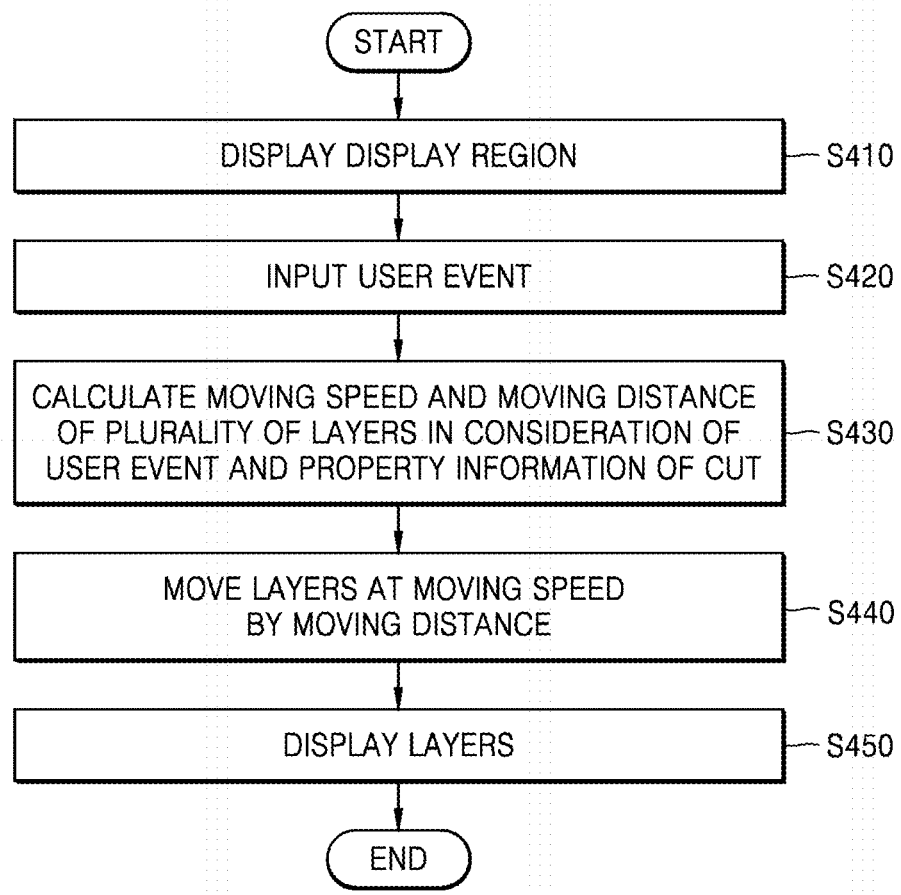
FIG. 13 is a flowchart of a cartoon content display method according to an exemplary embodiment.

FIG. 13 is a flowchart of a cartoon content display method according to exemplary embodiments.

Referring to FIG. 13, the cartoon content display method according to exemplary embodiments may include an operation S410 of displaying a display region, an operation S420 of inputting a user event, an operation S430 of calculating a moving speed and/or a moving distance, an operation S440 of moving layers at the moving speed by the moving distance, and an operation S450 of displaying the layers.

In operation S410, the cartoon content display apparatus 200 moves cartoon content in correspondence with the user event input through the display controller 212 and display a part of the cartoon content.

In operation S420, the input unit 240 receives the user event from a user. The user event is described above, and thus a detailed description thereof is omitted.

In operation S430, the event processor 211 calculates the moving speed and/or the moving distance of the cartoon content in correspondence with the user event and an effect of a cut and controls to move the cartoon content at the moving speed by the moving distance. In operation S430, the event processor 211 may calculate distance differences between initial and final locations of a plurality of layers included in the cut and determine moving speeds of the respective layers in relative consideration of the distance differences of the plurality of layers. For example, when a first distance difference between initial and final locations of a first layer is 2 times a second distance difference between initial and final locations of a second layer, a moving speed of the first layer may be calculated as 2 times a moving speed of the second layer.

In operation S440, the display unit 230 moves the plurality of layers included in the cut at the respective moving speeds by the respective moving distances. In this regard, the layers move in correspondence with the user event. That is, while the user event is input, the layers may move, and while the user event is not input, the layers may be stopped from moving and may stay at current locations.

In operation S450, the display controller 212 controls to move and display the layers at the moving speed.

FIGS. 14A through 14C show examples of a screen that displays a cut including layers to which a time difference effect is applied.

In this regard, the cut may include a first layer (a background image), a second layer, and a third layer. The first layer (the background image) that is a fixed layer, and the second layer and the third layer that include the time difference effect may move between initial and final locations.

As shown in FIGS. 14A through 14C, the cartoon content display apparatus 200 may move the first layer (the background image), the second layer A17a, A17b, A17c, and the third layer A18a, A18b, A18c that are included in the cut between the initial and final locations in order to display the time difference effect included in the cut. As shown in FIG. 14A, the cartoon content display apparatus 200 may move a location of the second layer from A17a to A17b via A17c and simultaneously move a location of the third layer from A18a to A18b via A18c. In this regard, a moving distance of the second layer A17a, A17b, A17c may be shorter than that of the third layer A18a, A18b, A18c, and thus the second layer A17a, A17b, A17c may move relatively slowly.

FIG. 15 shows an example of a user interface 1500 that displays cartoon content.

As shown in FIG. 15, a display region A19 includes wholly or partially the cartoon content and a plurality of cuts. The cartoon content generation apparatus 400 according to the exemplary embodiments may determine a moving speed of the cartoon content in proportion to lengths of the cuts and determine a moving speed in consideration of layer information included in the cuts, speed property information, number of words included in text, effect information, importance, number of the cuts, size of the screen, a distance difference between a current cut and a previous cut.

A length of a cut A20 is greater than that of a cut A21, and thus a moving speed is generally the same in correspondence with the same user event. If the cut A20 includes one fixed layer, and the cut A21 includes three time difference layers, although the length of the cut A20 is greater than that of the cut A21, when the same user event is input, the display time of the cut A21 is further increased by setting the moving speed of the cut A21 slower.

In other exemplary embodiments, if the number of words included in text included in the cut A20 is 0, and the number of words included in text included in the A21 is 50, although the length of the cut A20 is the same as that of the cut A21, when the same user event is input, the display time of the cut A21 further increased by setting the moving speed of the cut A22 slower.

FIGS. 16A and 16B show another example of a user interface 1600 that displays cartoon content.

When a cut A15a including a time difference effect satisfies a predetermined condition, the cut A15a including an layer A15b may be displayed. In order to prevent the cut A15a from passing by without displaying the layer A15b, the cartoon content display apparatus 200 according to the exemplary embodiments may reduce a moving distance or a moving speed that corresponds to a user event in consideration of the cut A15a having time difference effect when the moving distance or the moving speed is significantly great. That is, as shown in FIG. 16B, the cartoon content may be moved such that the cut A15a having time difference effect does not completely disappear.

Figure 17:
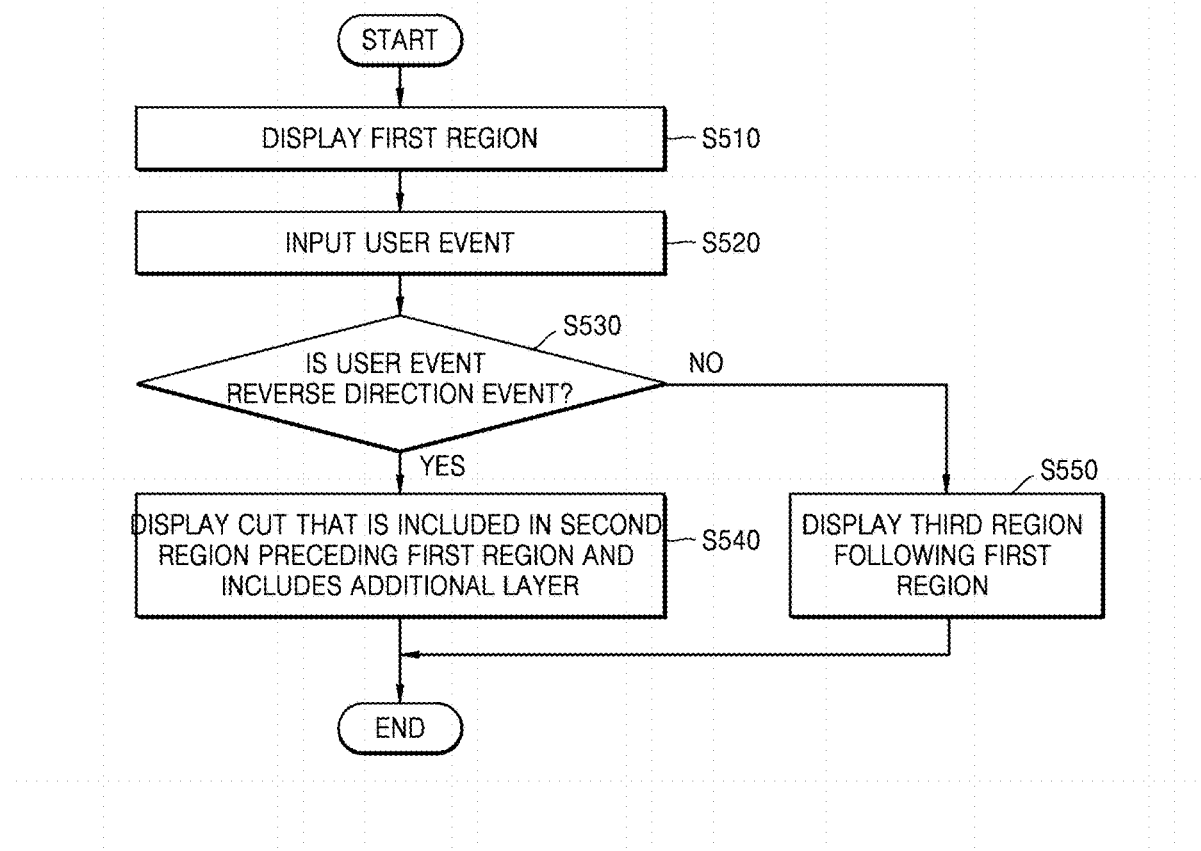
FIG. 17 is a flowchart of a cartoon content display method according to further exemplary embodiment.

FIG. 17 is a flowchart of a cartoon content display method according to another exemplary embodiment.

Referring to FIG. 17, the cartoon content display method according to the exemplary embodiments includes an operation S510 of displaying a first region, an operation S520 of inputting a user event, an operation S530 of determining a direction of a user event, and an operation S540 of displaying a cut that is included in a second region preceding the first region and includes an additional layer.

In operation S510, the cartoon content display apparatus 200 displays the first region that is a part of cartoon content. In operation S520, the cartoon content display apparatus 200 receive a user event through a mouse, a keyboard, or a touch screen. In operation S530, the cartoon content display apparatus 200 determines whether the user event is a reverse direction event. When the user event is a scroll input in a counterclockwise direction, a direction key input in an upper direction, or a touch input from a lower end to a higher end, the cartoon content display apparatus 200 may determine that the user event is a reverse direction event.

When the user event is a reverse direction event, in operation S540, the cartoon content display apparatus 200 controls to display the second region by moving the cartoon content forward from the first region by a moving distance corresponding to the user event and displays the cut of the second region to include the additional layer. In this regard, the additional layer is a layer that has not been displayed with respect to a movement and display of the cartoon content corresponding to a user event in a forward direction.

When the user event is the user event in the forward direction, in operation S550, the cartoon content display apparatus 200 controls to display a third region moved from the first region by a moving distance corresponding to the user event.

FIGS. 18A and 18B show an example of an additional layer displayed in correspondence with a user event in a reverse direction.

When the user event in the reverse direction is input, the cartoon content display apparatus 200 according to the exemplary embodiments may display a cut having a movement or a layer which are unlike those of a cut displayed with respect to a user event in a forward direction. With respect to the cut, a layer A23a may be displayed in correspondence with the user event in the forward direction as shown in FIG. 18A, whereas a new layer A23b may be further displayed in correspondence with the user event in the reverse direction as shown in FIG. 18B.

Figure 19:
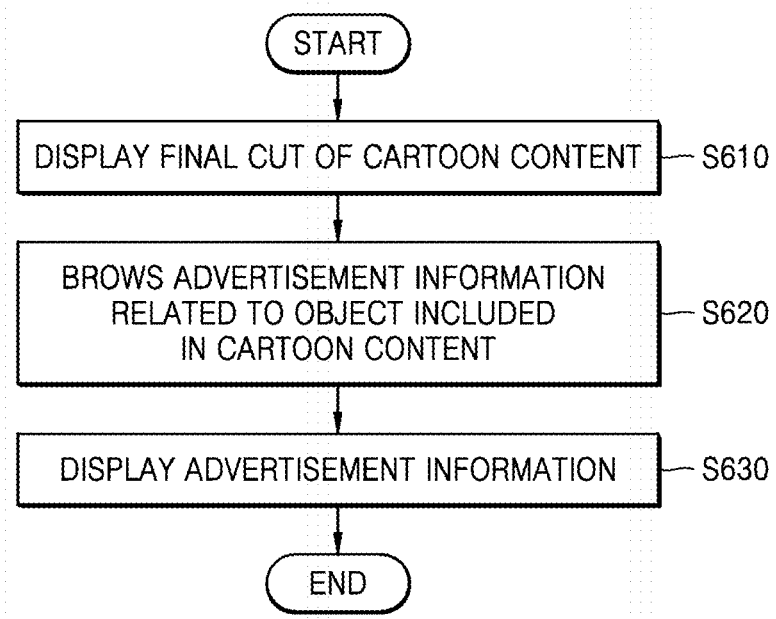
FIG. 19 is a flowchart of a cartoon content display method according to one exemplary embodiment.

FIG. 19 is a flowchart of a cartoon content display method according to an exemplary embodiment.

Referring to FIG. 19, the cartoon content display method according to the exemplary embodiment includes an operation S610 of displaying a final cut of cartoon content, an operation S620 of browsing advertisement information related to an object included in the cartoon content, and an operation S630 of displaying the advertisement information.

In operation S610, the display unit 230 displays a final cut of cartoon content provided at the time. In operation S620, the cartoon content display apparatus 200 may detect one or more objects included in the provided one piece of cartoon content and browse an advertisement related to the objects. In this regard, the objects include things such as coffee, Ramen, a TV set, a smart phone, etc. and characters. In this regard, the advertisement related to the objects may include an advertisement in which the objects appear, etc. For example, when coffee appears in the cartoon content, the cartoon content display apparatus 200 may browse an advertisement related to coffee after the final cut of the cartoon content.

In operation S630, the display controller 212 controls to display information regarding the browsed advertisement following the cartoon content.

FIGS. 20A and 20B show an example of an additional layer displayed in correspondence with a user event in a reverse direction.

The cartoon content display apparatus 200 according to the exemplary embodiments may display a cut A24a created by a cartoonist in correspondence with a user event in a forward direction when the user event in the reverse direction is input, whereas the cartoon content display apparatus 200 may display the cut A24a by changing coffee that is an object included in the cut A24a in correspondence with the user event in the reverse direction to an advertisement product requested by an advertiser.

Figure 21:
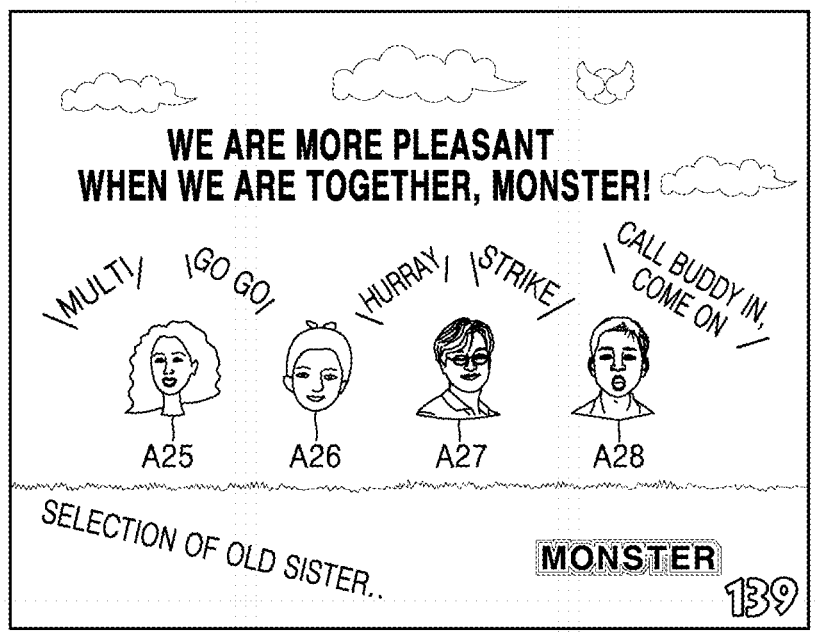
FIG. 21 shows an example of advertisement information that may be additionally displayed on cartoon content.

FIG. 21 shows an example of advertisement information that may be additionally displayed on cartoon content.

The cartoon content display apparatus 200 according to the exemplary embodiments may additionally provide the advertisement information after providing a final cut of the cartoon content. In this regard, the provided advertisement information may be related to the cartoon content. In this regard, the advertisement information related to the cartoon content may be an advertisement of a thing (coffee, Ramen, a TV set, a smart phone, etc) included in the cartoon content or an advertisement in which a character appearing in the cartoon content appears. Referring to FIG. 21, the cartoon content display apparatus 200 may simultaneously provide the cartoon content and an advertisement in which characters A25, A26, A27, and A28 appearing in the cartoon content appear.

As described above, according to the one or more of the above exemplary embodiments, cartoon content may be generated as intended by a cartoon content creator.

A cartoon content cut that expresses an effect selected by a cartoon content creator may also be generated based on the effect and property information according to a type of the effect.

A layer including various effects corresponding to user events may also be controlled to be displayed to include the effects.

The one or more of the above exemplary embodiments may be embodied as a computer program that can be executed in a computer using various components. The computer program may be recorded on a computer-readable recording medium. Examples of the computer-readable recording medium may include a magnetic recording medium (a hard disc, a floppy disc, a magnetic tape, etc.), an optical recording medium (a CD-ROM, a DVD, etc.), a magneto-optical medium (e.g., a floptical disk), and a hardware device (e.g., a ROM, a RAM, a flash memory, etc.) specially designed to store and execute program commands. Furthermore, the computer-readable recording medium may be a formless medium that can be transmitted and distributed in a network, e.g., software or an application.

The computer program may be designed and configured specially for the inventive concept or would be obvious to those of ordinary skill in the field of computer software. Examples of the computer program include not only machine language codes prepared by a compiler but also high-level language codes executable by a computer using an interpreter.

The use of the terms 'a', 'an', and 'the' and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein.

Finally, the operations of all methods described herein can be performed in an appropriate order unless otherwise indicated herein or otherwise clearly contradicted by context. The inventive concept is not limited by an order in which the operations are described herein. The use of any and all examples, or exemplary language (e.g., "such as") provided herein, is intended merely to clearly describe the inventive concept and does not pose a limitation on the scope of the inventive concept unless otherwise claimed. Numerous modifications and adaptations will be readily apparent to those skilled in this art without departing from the spirit and scope of the inventive concept.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. An apparatus for generating cartoon content having at least one cut, the apparatus comprising:
   a cut input controller configured to control inputting a signal for adding a cut having a plurality of layers;
   an effect input controller configured to control inputting an effect applied to the plurality of layers; and
   a cut generator configured to generate a final cut such that the plurality of layers express the effect in correspondence with a user event received from a user,
   wherein an additional layer among the plurality of layers of the final cut is applied with an effect which enables the additional layer to be displayed on a display region within the final cut along with other remaining layers of the plurality of layers only when the final cut is scrolled to move in a reverse direction on the display region according to the user event for scrolling the cartoon content on the display region;
   wherein the additional layer is not displayed on the display region while the other remaining layers are displayed on the display region when the final cut is scrolled to move in a forward direction on the display region according to the user event.

2. The apparatus of claim 1, wherein the effect input controller controls inputting of an initial color and a final color of each of the plurality of layers in correspondence with the effect, and
   the cut generator generates the final cut such that each of the plurality of layers change from the initial color to the final color.

3. The apparatus of claim 1, wherein the effect input controller controls receiving of an initial location and a final location of at least two of the plurality of layers in the final cut in correspondence with the effect, and
   the cut generator determines a moving speed of each of the at least two of the plurality of layers in consideration of a distance difference between the initial location and the final location of each of the at least two of the plurality of layers, and generates the final cut such that the at least two of the plurality of layers individually move at the moving speed of each of the at least two of the plurality of layers while adjusting a display location of the at least two of the plurality of layers within the final cut in consideration of a movement of the final cut on a display region corresponding to the user event.

4. The apparatus of claim 3, wherein the effect input controller further inputs an intermediate location of each of the at least two of the plurality of layers in correspondence with the effect, and
   the cut generator calculates a first speed based on a distance difference between the initial location and the intermediate location of each of the at least two of the plurality of layers, calculates a second speed based on a distance difference between the intermediate location and the final location of each of the at least two of the plurality of layers, and generates the final cut such that each of the at least two of the plurality of layers move in the first speed and then in the second speed from the intermediate location.

5. The apparatus of claim 3, wherein the initial location or the final location is an arbitrary location inside or outside the cut.

6. A method of generating cartoon content having at least one cut, the method comprising:
   inputting, by a cut input controller, a signal for adding a cut comprising a plurality of layers;
   inputting, by an effect input controller, an effect applied to the plurality of layers; and
   generating, by a cut generator, a final cut such that the plurality of layers express the effect in correspondence with a user event received from a user,
   wherein an additional layer among the plurality of layers of the final cut is applied with an effect which enables the additional layer to be displayed on a display region within the final cut along with other remaining layers of the plurality of layers only when the final cut is scrolled to move in a reverse direction on the display region according to the user event for scrolling the cartoon content on the display region,
   wherein the additional layer is not displayed on the display region while the other remaining layers are displayed on the display region when the final cut is scrolled to move in a forward direction on the display region according to the user event.

7. An apparatus for displaying cartoon content having at least one cut that includes a plurality of layers, the apparatus comprising:
   a display unit configured to display a display region of the cartoon content on a display screen of a user terminal;
   an input unit configured to input a user event from a user;
   an event processor configured to calculate a moving distance of the display region of the cartoon content corresponding to the user event; and a display controller configured to control displaying of the cartoon content as much as the moving distance while adjusting a display location of a layer included in the cut in consideration of a movement of the cut on the display region corresponding to the user event for scrolling the cartoon content on the display region;

wherein an additional layer from one of the plurality of layers of the cut is applied with an effect which enables the additional layer to be displayed on the display region along with other remaining layers of the plurality of layers when the cut is scrolled in a reverse direction, and which excludes the additional layer from being displayed on the display region while the other remaining layers are displayed on the display region when the cut is scrolled in a forward direction.

* * * * *